United States Patent [19]

Synosky et al.

[11] Patent Number: 5,437,877

[45] Date of Patent: Aug. 1, 1995

[54] WAX-FREE CHEWING GUM WITH INITIAL SOFT BITE

[75] Inventors: Steven P. Synosky, Greenbrook, N.J.; Michael A. Reed, Merrillville, Ind.; Kenneth W. Laughlin, Richardson, Tex.

[73] Assignee: Wm. Wrigley Jr. Company, Chicago, Ill.

[21] Appl. No.: 302,699

[22] PCT Filed: Mar. 2, 1993

[86] PCT No.: PCT/US93/01941

§ 371 Date: Aug. 30, 1994

§ 102(e) Date: Aug. 30, 1994

[87] PCT Pub. No.: WO93/17578

PCT Pub. Date: Sep. 16, 1993

[51] Int. Cl.⁶ ............................................. A23G 3/30
[52] U.S. Cl. ........................................... 426/3; 426/4
[58] Field of Search ...................................... 426/3–6

[56] References Cited

U.S. PATENT DOCUMENTS

| | | | |
|---|---|---|---|
| 1,534,929 | 4/1925 | Dunham | 426/3 |
| 1,534,930 | 4/1925 | Dunham | 420/3 |
| 1,534,931 | 4/1925 | Dunham | 426/3 |
| 1,807,704 | 6/1931 | Pappadis | 426/3 |
| 2,078,878 | 4/1937 | Jackman | 99/135 |
| 2,265,465 | 12/1941 | Wilson | 99/135 |
| 2,289,407 | 7/1942 | Hampton | 99/135 |
| 2,782,123 | 2/1957 | Rubin | 99/141 |
| 3,161,524 | 12/1964 | Opie et al. | 99/94 |
| 3,262,784 | 7/1966 | Bucher | 99/135 |
| 3,632,358 | 1/1972 | Echeandia et al. | 99/135 |
| 3,766,165 | 10/1973 | Rennhard | 260/209 R |
| 3,843,818 | 10/1974 | Wren et al. | 426/346 |
| 3,857,965 | 12/1974 | Ream | 426/3 |
| 3,894,146 | 7/1975 | Tsuyama | 424/49 |
| 3,974,032 | 8/1976 | Harjes et al. | 195/31 R |
| 3,984,574 | 10/1976 | Comollo | 426/4 |
| 3,995,064 | 11/1976 | Ehrgott et al. | 426/3 |
| 3,996,389 | 12/1976 | Osborne | 426/565 |
| 4,065,579 | 12/1977 | Mackay et al. | 426/3 |
| 4,139,639 | 2/1979 | Bahoshy et al. | 426/3 |
| 4,150,161 | 4/1979 | Rudolph et al. | 426/3 |
| 4,187,320 | 2/1980 | Koch et al. | 426/3 |
| 4,224,345 | 9/1980 | Tezuka et al. | 426/3 |
| 4,230,687 | 10/1980 | Sair et al. | 424/22 |
| 4,352,822 | 9/1982 | Cherukuri et al. | 426/4 |
| 4,352,823 | 10/1982 | Cherukuri et al. | 426/5 |
| 4,357,355 | 11/1982 | Koch et al. | 426/4 |
| 4,359,531 | 11/1982 | Bucke et al. | 435/97 |
| 4,382,963 | 5/1983 | Klose et al. | 426/3 |
| 4,384,004 | 5/1983 | Cea et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,497,846 | 2/1985 | Boursier et al. | 426/660 |
| 4,514,422 | 4/1985 | Yang et al. | 426/3 |
| 4,515,769 | 5/1985 | Merritt et al. | 424/49 |
| 4,528,206 | 7/1985 | Kastin | 426/660 |
| 4,556,429 | 12/1985 | Takazoe et al. | 127/30 |
| 4,579,738 | 4/1986 | Cherukuri et al. | 426/3 |
| 4,581,234 | 4/1986 | Cherukuri et al. | 426/3 |
| 4,587,119 | 5/1986 | Bucke et al. | 424/48 |
| 4,587,125 | 5/1986 | Cherukuri et al. | 424/48 |

(List continued on next page.)

FOREIGN PATENT DOCUMENTS

| | | |
|---|---|---|
| 0067665 | 12/1982 | European Pat. Off. . |
| 0082670 | 6/1983 | European Pat. Off. . |
| 0236271 | 9/1987 | European Pat. Off. . |
| 0252874 | 1/1988 | European Pat. Off. . |
| 0301628 | 2/1989 | European Pat. Off. . |
| 0325090 | 7/1989 | European Pat. Off. . |
| 0337889 | 10/1989 | European Pat. Off. . |

(List continued on next page.)

OTHER PUBLICATIONS

"Textbook Of Polymer Science", Second Edition, by Billmeyer, Jr., John Wiley & Sons, Inc. (1971), pp. 23–61.

L. A. Dreyfus Company—List Of Known Gum Base Compositions, 7 pp., Aug. 25, 1994.

(List continued on next page.)

*Primary Examiner*—Jeanette Hunter
*Attorney, Agent, or Firm*—Maxwell J. Petersen; Willian Brinks Hofer Gilson & Lione

[57] ABSTRACT

A wax-free chewing gum is provided, which chewing gum includes a gum base comprising about 20 to about 60 weight percent of a blend of at least two synthetic elastomers, 0 to about 30 weight percent of at least one natural elastomer, about 5 to about 55 weight percent of at least one elastomer plasticizer, about 4 to about 40 weight percent of at least one filler, about 5 to about 40 weight percent of at least one softener, and optional minor amounts of miscellaneous ingredients such as colors, antioxidants, etc. The chewing gum compositions containing the wax-free gum base above also have an initial soft bite, as measured by Taber Stiffness and Instron yields. Taber Stiffness and Instron yields are preferably at least 5 percent lower than those for a comparable wax containing gum.

The wax-free chewing gums may be produced and wrapped at about from 10 percent to about 60 percent of the time required for comparable wax containing chewing gums.

44 Claims, No Drawings

U.S. PATENT DOCUMENTS

| | | | |
|---|---|---|---|
| 4,597,970 | 7/1986 | Sharma et al. | 426/5 |
| 4,604,287 | 8/1986 | Glass et al. | 426/5 |
| 4,634,593 | 1/1987 | Stroz et al. | 426/5 |
| 4,671,961 | 6/1987 | Patel et al. | 426/3 |
| 4,671,967 | 6/1987 | Patel et al. | 426/658 |
| 4,681,771 | 7/1987 | Adachi et al. | 426/658 |
| 4,683,138 | 7/1987 | Glass et al. | 426/5 |
| 4,695,326 | 9/1987 | Takazoe et al. | 127/30 |
| 4,728,515 | 3/1988 | Patel et al. | 426/3 |
| 4,737,366 | 4/1988 | Gergely et al. | 426/5 |
| 4,741,905 | 5/1988 | Huzinec | 426/3 |
| 4,765,991 | 8/1988 | Cherukuri et al. | 426/3 |
| 4,786,722 | 11/1988 | Zehner | 536/1.1 |
| 4,792,453 | 12/1988 | Reed et al. | 426/5 |
| 4,794,003 | 12/1988 | Cherukuri et al. | 426/6 |
| 4,802,924 | 2/1989 | Woznicki et al. | 427/3 |
| 4,804,544 | 2/1989 | Cherukuri et al. | 426/5 |
| 4,816,265 | 3/1989 | Cherukuri et al. | 426/5 |
| 4,872,884 | 10/1989 | Cherukuri et al. | 426/3 |
| 4,889,727 | 12/1989 | Dave et al. | 426/3 |
| 4,931,294 | 6/1990 | Yatka et al. | 426/3 |
| 4,933,188 | 6/1990 | Cherukuri et al. | 426/3 |
| 4,938,971 | 7/1990 | Chapdelaine et al. | 426/3 |
| 4,948,596 | 8/1990 | Bunick et al. | 426/3 |
| 4,954,353 | 9/1990 | Cherukuri et al. | 426/5 |
| 4,961,935 | 10/1990 | Cherukuri et al. | 426/5 |
| 4,971,787 | 11/1990 | Cherukuri et al. | 414/48 |
| 4,971,806 | 11/1990 | Cherukuri et al. | 426/5 |
| 4,975,287 | 12/1990 | Zibell et al. | 426/3 |
| 4,978,751 | 12/1990 | Biton et al. | 536/123 |
| 4,980,177 | 12/1990 | Cherukuri et al. | 426/3 |
| 4,983,405 | 1/1991 | Cherukuri et al. | 426/3 |
| 4,986,991 | 1/1991 | Yatka et al. | 426/3 |
| 5,009,900 | 4/1991 | Levine et al. | 426/96 |
| 5,023,093 | 6/1991 | Cherukuri et al. | 426/3 |
| 5,039,530 | 8/1991 | Yatka et al. | 426/3 |
| 5,041,294 | 8/1991 | Patel | 426/3 |
| 5,059,429 | 10/1991 | Cherukuri et al. | 426/3 |
| 5,066,511 | 11/1991 | Cherukuri et al. | 426/658 |
| 5,082,671 | 1/1992 | Cherukuri | 426/3 |
| 5,085,872 | 2/1992 | Patel et al. | 426/4 |
| 5,087,459 | 2/1992 | Chuu et al. | 426/4 |
| 5,100,678 | 3/1992 | Reed et al. | 426/3 |
| 5,120,550 | 6/1992 | Van der Schueren | 426/3 |
| 5,139,798 | 8/1992 | Yatka et al. | 426/5 |
| 5,165,943 | 11/1992 | Patel et al. | 426/3 |
| 5,165,944 | 11/1992 | Song et al. | 426/5 |
| 5,167,972 | 12/1992 | Greenberg et al. | 426/3 |
| 5,169,657 | 12/1992 | Yatka et al. | 426/5 |
| 5,169,658 | 12/1992 | Yatka et al. | 426/5 |
| 5,171,589 | 12/1992 | Rickey et al. | 426/5 |
| 5,178,889 | 1/1993 | Reed et al. | 426/3 |
| 5,192,562 | 3/1993 | Grey et al. | 426/4 |

FOREIGN PATENT DOCUMENTS

| | | |
|---|---|---|
| 0351972 | 1/1990 | European Pat. Off. |
| 0351973 | 1/1990 | European Pat. Off. |
| 0368451 | 5/1990 | European Pat. Off. |
| 0390438 | 10/1990 | European Pat. Off. |
| 0397027 | 11/1990 | European Pat. Off. |
| 0398465 | 11/1990 | European Pat. Off. |
| 0421670 | 4/1991 | European Pat. Off. |
| 0425115 | 5/1991 | European Pat. Off. |
| 0438912 | 7/1991 | European Pat. Off. |
| 0449594 | 10/1991 | European Pat. Off. |
| 0457098 | 11/1991 | European Pat. Off. |
| 0472428 | 2/1992 | European Pat. Off. |
| 0566174 | 10/1993 | European Pat. Off. |
| 2626583 | 8/1989 | France |
| 2115461 | 3/1971 | Germany |
| 58-138355 | 8/1983 | Japan |
| 60-224449 | 11/1985 | Japan |
| 61-173748 | 6/1986 | Japan |
| 62-146562 | 6/1987 | Japan |
| 62-148496 | 7/1987 | Japan |
| 1-19860 | 4/1989 | Japan |
| 2-100695 | 4/1990 | Japan |
| 2-154664 | 6/1990 | Japan |
| 3-20301 | 1/1991 | Japan |
| 3-47831 | 7/1991 | Japan |
| 3-47832 | 7/1991 | Japan |
| 347376 | 4/1931 | United Kingdom |
| 378073 | 8/1932 | United Kingdom |
| 2063268 | 11/1979 | United Kingdom |
| 2066639 | 11/1979 | United Kingdom |
| 84-01693 | 5/1984 | WIPO |
| 89-03170 | 4/1989 | WIPO |
| 90-06061 | 6/1990 | WIPO |
| 90-06317 | 6/1990 | WIPO |
| 90-07859 | 7/1990 | WIPO |
| 90-07864 | 7/1990 | WIPO |
| 91-03147 | 3/1991 | WIPO |
| 92-10943 | 7/1992 | WIPO |

OTHER PUBLICATIONS

"Fructooligosaccharides (FOS)—An All Natural, Versatile, Low-Calorie Bulking Agent", by Dr. Peter Perna, Coors Biotech, Inc. (date unknown).

*Polymer Handbook*, Second Edition, by Bandrup & Immergut, John Wiley & Sons, Inc. (1975), pp. IV-337 to V-375.

Raftilose, "Oligofrustose", by Raffinerie Tirlemontoise S.A. and Tiense Suikerraffinaderij N. V.

"Soluble & Insoluble Bulking Agents, Prospects & Applications", by Smits and Norman, presented at IBC Bulking Agents Conference (Mar. 13, 1991).

WAX-FREE CHEWING GUM WITH INITIAL SOFT BITE

RELATED APPLICATIONS

This application is a continuation-in-part of International Application No. PCT/US92/11317, filed on Dec. 30, 1992, which in turn is a continuation-in-part of International Application No. PCT/US92/09615, filed on Nov. 6, 1992, which in turn is a continuation-in-part of PCT/US92/01686, filed on Mar. 3, 1992.

FIELD OF THE INVENTION

The present invention relates to an improved chewing gum of the type which does not contain wax, and to certain wax-free chewing gum products having an initial soft bite as measured by a Taber Stiffness Test (Taber Units) and by Instron yield data. The gum also has excellent tempering times, a good surface toughness and can be produced more quickly than comparable wax containing gums.

BACKGROUND OF THE INVENTION

U.S. Pat. No. 3,984,574, issued to Comollo, discloses an adhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomers from chewing gum base, and substituted in their place one or more non-tacky synthetic elastomers such as polyisobutylene, polyisoprene, isobutyleneisoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinylacetate, fatty acids, and mono and diglycerides of fatty acids. Comollo provided no information relating to the relationship of initial soft bite and toughness.

SUMMARY OF THE INVENTION

The present invention is directed to improvements in a wax-free chewing gum base (i.e. a chewing gum base which is free of hydrocarbon-containing waxes) and improved wax-free chewing gums prepared therefrom. The wax-free gum base of the invention includes quantities and mixtures of selected synthetic elastomers, selected and preferred elastomer plasticizers, filler, and selected and preferred softeners. However, unlike Comollo, the gum base of the invention is not limited to use in a non-tack chewing gum and may, therefore, contain optional quantities of natural elastomer and/or natural resins. The gum base of the invention may also contain optional quantities of minor ingredients such as color and antioxidant. The gum base of the invention most preferably contains a preferred blend of at least two synthetic elastomers, including certain vinyl polymers, particularly polyvinylacetate.

The optional use of natural elastomers in the gum base compliments certain chewing gum flavors, such as mint oil, by rounding out the otherwise harsh or grassy notes in the flavor. The presence of natural elastomers and natural resins in the gum base also contributes to improved chewing gum texture and flavor retention.

There is currently a need or desire in the chewing gum industry for gum bases which are devoid or substantially free of hydrocarbon-containing waxes and which contain desired quantities of both synthetic and natural elastomers, natural resins, or both.

With the foregoing in mind, it is a feature and advantage of the invention to provide a substantially wax-free chewing gum base.

It is also a feature and advantage of the invention to provide a suitably soft gum base in which wax is not needed to soften the gum base.

It is also a feature and advantage of the invention to provide a suitably soft wax-free gum base which gum base comprises multiple blended synthetic elastomers, selected elastomer plasticizers and selected softeners, and which gum base may be blended with selected sweeteners, bulking agents and binders, as well as certain water soluble or water dispersible softeners to provide a chewing gum having soft initial bite.

It is also a feature and advantage of the invention to improve the compatibility of gum base and other chewing gum ingredients during the blending and mixing processes.

It is also a feature and advantage of the invention to provide improved chewing gums having initial soft bite and which contain the wax-free chewing gum bases of the invention.

It is also a feature and advantage of the invention to provide chewing gum products having desirable properties such as flavor quality and strength, flavor and sweetness retention, breath freshening, dental and oral health properties and good shelf stability.

It is also a feature and advantage of the invention to provide a wax-free chewing gum with soft initial bite, faster wrapping time and more efficient processing time, which chewing gum is not only wax-free, but is also preferably low in moisture and contains certain selected blends of synthetic elastomers, oil and water soluble/dispersible softeners, and certain selected binders, and which gum has certain physical characteristics which permit soft initial bite and toughness permitting rapid set-up and more efficient production.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

In accordance with the invention, a wax-free chewing gum base is provided for use in either non-tack or conventional chewing gum, which may be either bubble gum or regular chewing gum. The chewing gum base of the invention contains about 20 to about 60 weight percent of a blend of synthetic elastomers, 0 to about 30 weight percent natural elastomer, about 5 to about 55 weight percent elastomer plasticizer, about 4 to about 40 weight percent of filler, about 5 to about 40 weight percent softener, and optional minor amounts (about one percent or less) of miscellaneous ingredients such as colorants, antioxidants, etc.

The synthetic elastomers may include, but are not limited to, polyisobutylene with GPC molecular weight of about 10,000 to about 95,000, isobutylene-isoprene copolymer (butyl elastomer) having a GPC molecular weight of about 10,000 to 95,000 and an isobutylene to isoprene weight ratio of from about 0.2:99.8 to 99.8 to 0.2, styrene-butadiene copolymers having styrene-butadiene weight ratios of about 1:3 to about 3:1 and a GPC molecular weight of from about 5,000 to about 80,000, polyvinylacetate having GPC molecular weight of about 2,000 to about 90,000, polyisoprene having a GPC molecular weight of about 10,000 to 90,000, polyethylene, vinyl acetate-vinyl laurate copolymer having vinyl laurate content of about 5 to about 50 percent by weight of the copolymer and a GPC molecular weight of from 5,000–80,000, and combinations thereof. Polyvinylacetate, polyethylene, and the vinyl laurate copolymers are sometimes also referred to as vinyl polymers.

Preferred ranges are, for polyisobutylene, 50,000 to 80,000 GPC molecular weight, for styrene-butadiene, 1:1 to 1:3 bound styrene-butadiene, for polyvinylacetate, 10,000 to 65,000 GPC molecular weight with the higher molecular weight polyvinylacetates typically used in bubble gum base, and for the vinyl acetate-vinyl laurate copolymers, a vinyl laurate content of 10–45 percent.

The most preferred synthetic elastomers are the styrene-butadiene (SBR) copolymers, the polyisobutylenes (PIB), and the isoprene-isobutylene copolymers (butyl rubber or butyl elastomer). The preferred use of these synthetic elastomers includes a blend of at least two and preferably all three of these elastomers, preferably with polyvinylacetate. In terms of elastomer content, the improved wax-free gum bases have from about 20–60 weight percent synthetic elastomers, which synthetic elastomers are SBR, PIB, and butyl elastomer blends, which blends most preferably contain from 0–20 percent SBR, from 20–80 percent PIB, and from 0–40 percent butyl rubber. (All based on total synthetic elastomer percent.)

These synthetic elastomer blends may also be blended with certain vinyl polymers such as polyvinylacetate, polyethylene, vinyl acetate-vinyl laurate copolymers, and the like. Generally, in such an elastomer/vinyl polymer blend, the total synthetic elastomer content ranges from about 20–80 weight percent of the blend and the vinyl polymer content ranges from about 80–20 weight percent of the blend. Preferably this elastomer/vinyl polymer blend contains from about 40–60 weight percent synthetic elastomers and from 60–40 weight percent vinyl polymers, preferably as polyvinylacetate.

Natural elastomers may also be optionally present and include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, chiquibul, crown gum, pendare, venezuelau chicle, leche de vaca, niger gutta, tunu, chilte and combinations thereof. The preferred natural elastomers are jelutong, chicle, sorva and massaranduba balata. The preferred synthetic elastomers and natural elastomers and the preferred synthetic and natural elastomer concentrations vary depending on whether the chewing gum in which the base is used is adhesive or conventional, bubble gum or regular gum, as discussed below.

Elastomer plasticizers may include, but are not limited to, natural rosin esters such as glycerol esters of partially hydrogenated rosin, glycerol esters of polymerized rosin, glycerol esters of partially dimerized rosin, glycerol esters of rosin, glycerol ester of tall oil rosin, pentaerythritol esters of partially hydrogenated rosin, methyl and partially hydrogenated methyl esters of rosin, pentaerythritol esters of rosin; synthetics such as terpene resins derived from alphapinene, beta-pinene, and/or d-limonene; natural terpene resin; and any suitable combinations of the foregoing. The preferred elastomer plasticizers will also vary depending on the specific application, and on the type of elastomer which is used. For example, use of terpene resin to wholly or partially replace ester gums will cause the gum base to be less tacky.

The term "wax-free" as used herein refers to the exclusion of waxes which contain mineral hydrocarbons. Natural waxes such as carnauba wax, bees wax, rice bran wax, and candellila wax do not contain mineral hydrocarbons and are therefor acceptable for use in the chewing gum base and chewing gums prepared therefrom. However, the preferred chewing gums, and the bases of this invention would normally contain less than 5 weight percent natural wax in the gum base, and most preferably are free of natural waxes.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol acetate, glycerol diacetate (diacetin) and glycerol triacetate (triacetin), lecithin, mono-, di- and triglycerides, acetylated monoglycerides, fatty acids (e.g. stearic, palmitic, oleic and linoleic acids), lanolin, and combinations thereof. Hydrogenated or partially hydrogenated vegetable oils are generally preferred, either alone or in combination with other softeners such as lecithin and/or glycerol monostearate.

Colorants and whiteners may include FD&C-type dyes and lakes, fruit and vegetable extracts, titanium dioxide, cocoa powder and combinations thereof.

The wax-free gum base of the invention may also contain optional ingredients such as antioxidants. Synthetic antioxidants may include butylated hydroxyanisole (BHA), butylated hydroxy-toluene (BHT) and tertiary, butyl hydroquinone (TBHQ). Natural antioxidants may include tocopherols, mixed tocopherols, eugenol, gum guaiac, thymol, carvacrol, and spice extracts of thyme, oregano, rosemary, nutmeg, ginger and mixtures thereof. The usage level will depend on the antioxidant selected but will generally be at or above the level of maximum effectiveness. Generally speaking, the higher the content of unsaturated vegetable oils, the greater the concentration of anti-oxidant is required in wax-free gum bases and chewing gums of this invention.

When the wax-free gum base of the invention is to be used in a regular (non-bubble) gum which has at least some adhesive (reduced tack) characteristics, the base should contain about 10 to about 40 weight percent synthetic elastomer, about 15 to about 30 weight percent elastomer plasticizer, about 5 to about 30 weight percent filler, about 15 to about 35 weight percent softener, 0 to about 1 weight percent colorant and 0 to about 0.1 weight percent antioxidant. Specific embodiments of some wax-free gum bases are provided in Examples 1-30 below.

TABLE 1

Wax-Free Gum Bases
For Use In Chewing Gum Having
Some Reduced Tack Characteristics (Examples 1-30)

EXAMPLES 1-5

| GENERIC INGREDIENTS | IDENTIFICATION - EXAMPLE #: | | | | |
|---|---|---|---|---|---|
| | 1 | 2 | 3 | 4 | 5 |
| ** SYNTHETIC ELASTOMER ** | | | | | |
| STYRENE-BUTADIENE ELASTOMER | 5.3 | — | 2.1 | 1.3 | 1.8 |
| BUTYL (ISOPRENE-ISOBUTYLENE) ELASTOMER | 8.6 | 7.9 | 7.2 | 14.8 | — |
| POLYISOBUTYLENE ELASTOMER | 7.1 | — | 7.4 | 5.2 | 24.8 |
| POLYVINYL ACETATE | 10.5 | 27.2 | 15.3 | 12.1 | 10.1 |
| ** ELASTOMER PLASTICIZERS ** | | | | | |
| GLYCEROL ESTERS OF ROSIN | 2.1 | — | 19.0 | — | 3.7 |
| GLYCEROL ESTERS OF PART HYD ROSIN | 4.3 | 18.2 | — | 15.3 | 7.9 |
| TERPENE RESINS | 10.8 | — | — | — | 7.1 |
| ** FILLER ** | | | | | |
| CALCIUM CARBONATE | — | 15.9 | 20.7 | — | 17.7 |
| TALC | 25.5 | — | — | 16.7 | — |
| ** SOFTENER ** | | | | | |
| HYDROGENATED VEGETABLE OIL | 15.3 | 22.6 | 24.3 | 28.4 | 21.0 |
| GLYCEROL MONOSTEARATE | 8.2 | 7.4 | 4.0 | 5.1 | 3.5 |
| LECITHIN | 2.3 | 0.8 | — | 1.1 | 2.4 |
| TOTAL PERCENT | 100.0 | 100.0 | 100.0 | 100.0 | 100.0 |

EXAMPLES 6-10

| GENERIC INGREDIENTS | IDENTIFICATION - EXAMPLE #: | | | | |
|---|---|---|---|---|---|
| | 6 | 7 | 8 | 9 | 10 |
| ** SYNTHETIC ELASTOMER ** | | | | | |
| STYRENE-BUTADIENE ELASTOMER | — | — | — | 5.2 | 2.1 |
| BUTYL (ISOPRENE-ISOBUTYLENE) ELASTOMER | 8.1 | 14.6 | 9.4 | 4.1 | 7.2 |
| POLYISOBUTYLENE ELASTOMER | 3.6 | 1.2 | 13.0 | 5.9 | 7.3 |
| POLYVINYL ACETATE | 27.5 | 26.2 | 22.3 | 25.7 | 15.3 |
| ** ELASTOMER PLASTICIZERS ** | | | | | |
| GLYCEROL ESTERS OF ROSIN | — | 4.9 | — | 23.5 | 19.1 |
| GLYCEROL ESTERS OF PART HYD ROSIN | — | 12.6 | — | — | — |
| TERPENE RESINS | 27.1 | — | 10.0 | 3.2 | — |
| ** FILLER ** | | | | | |
| CALCIUM CARBONATE | 10.9 | — | 20.0 | 15.1 | 20.7 |
| TALC | — | 13.1 | — | — | — |
| ** SOFTENER ** | | | | | |
| HYDROGENATED VEGETABLE OIL | 14.3 | 16.6 | 20.7 | 12.2 | 24.3 |
| GLYCEROL MONOSTEARATE | 4.8 | 9.6 | 4.6 | 5.1 | 4.0 |
| LECITHIN | 3.7 | 1.2 | — | — | — |
| TOTAL PERCENT | 100.0 | 100.0 | 100.0 | 100.0 | 100.0 |

EXAMPLES 11-15

| GENERIC INGREDIENTS | IDENTIFICATION - EXAMPLE #: | | | | |
|---|---|---|---|---|---|
| | 11 | 12 | 13 | 14 | 15 |
| ** SYNTHETIC ELASTOMER ** | | | | | |
| STYRENE-BUTADIENE ELASTOMER | 4.3 | 5.9 | 3.9 | — | 2.1 |
| BUTYL (ISOPRENE-ISOBUTYLENE) ELASTOMER | 6.2 | 6.9 | 5.3 | 9.3 | 6.0 |
| POLYISOBUTYLENE ELASTOMER | 6.4 | 2.0 | 12.7 | 12.1 | 8.5 |
| POLYVINYL ACETATE | 21.8 | 24.8 | 14.9 | 21.4 | 15.3 |
| ** ELASTOMER PLASTICIZERS ** | | | | | |
| GLYCEROL ESTERS OF ROSIN | 2.6 | 8.6 | — | — | 10.1 |
| GLYCEROL ESTERS OF PART HYD ROSIN | — | 8.0 | — | — | 8.9 |
| TERPENE RESINS | 17.1 | 1.9 | 21.4 | 6.5 | — |
| ** FILLER ** | | | | | |
| CALCIUM CARBONATE | — | 9.9 | 13.7 | 21.4 | 20.9 |
| TALC | 14.6 | 7.2 | 1.4 | — | — |
| ** SOFTENER ** | | | | | |
| HYDROGENATED VEGETABLE OIL | 19.5 | 21.1 | 18.7 | 25.2 | 24.2 |
| GLYCEROL MONOSTEARATE | 4.4 | 3.7 | 5.7 | 4.1 | 4.0 |

TABLE 1-continued

Wax-Free Gum Bases
For Use In Chewing Gum Having
Some Reduced Tack Characteristics (Examples 1–30)

| | | | | | |
|---|---|---|---|---|---|
| LECITHIN | 3.1 | — | 2.3 | — | — |
| TOTAL PERCENT | 100.0 | 100.0 | 100.0 | 100.0 | 100.0 |

EXAMPLES 16–20

| GENERIC INGREDIENTS | IDENTIFICATION - EXAMPLE #: | | | | |
|---|---|---|---|---|---|
| | 16 | 17 | 18 | 19 | 20 |
| **  SYNTHETIC ELASTOMER ** | | | | | |
| STYRENE-BUTADIENE ELASTOMER | 1.6 | — | 2.7 | — | — |
| BUTYL (ISOPRENE-ISOBUTYLENE) ELASTOMER | 3.7 | 8.1 | 2.3 | 8.9 | 3.6 |
| POLYISOBUTYLENE ELASTOMER | 6.8 | 3.6 | 14.2 | 10.0 | 11.1 |
| POLYVINYL ACETATE | 22.3 | 27.3 | 17.3 | 21.3 | 21.9 |
| ** ELASTOMER PLASTICIZERS ** | | | | | |
| GLYCEROL ESTERS OF ROSIN | 9.9 | — | — | — | 19.6 |
| GLYCEROL ESTERS OF PART HYD ROSIN | 4.3 | — | 27.3 | — | 11.2 |
| TERPENE RESINS | 11.6 | 26.9 | — | 9.7 | 3.7 |
| ** FILLER ** | | | | | |
| CALCIUM CARBONATE | — | 11.3 | — | 21.5 | 6.4 |
| TALC | 17.2 | — | 8.2 | — | — |
| ** SOFTENER ** | | | | | |
| HYDROGENATED VEGETABLE OIL | 17.8 | 14.3 | 22.4 | 23.2 | 19.2 |
| GLYCEROL MONOSTEARATE | 4.8 | 4.8 | 2.7 | 5.4 | 3.3 |
| LECITHIN | — | 3.7 | 2.9 | — | — |
| TOTAL PERCENT | 100.0 | 100.0 | 100.0 | 100.0 | 100.0 |

EXAMPLES 21–25

| GENERIC INGREDIENTS | IDENTIFICATION - EXAMPLE #: | | | | |
|---|---|---|---|---|---|
| | 21 | 22 | 23 | 24 | 25 |
| ** SYNTHETIC ELASTOMER ** | | | | | |
| STYRENE-BUTADIENE ELASTOMER | — | 1.4 | 3.2 | — | 4.1 |
| BUTYL (ISOPRENE-ISOBUTYLENE) ELASTOMER | 7.4 | 8.4 | 7.3 | 8.8 | 11.3 |
| POLYISOBUTYLENE ELASTOMER | 1.9 | 1.6 | 7.5 | 3.5 | 7.9 |
| POLYVINYL ACETATE | 24.8 | 23.1 | 21.1 | 27.9 | 18.2 |
| ** ELASTOMER PLASTICIZERS ** | | | | | |
| GLYCEROL ESTERS OF ROSIN | — | 13.1 | 15.3 | — | — |
| GLYCEROL ESTERS OF PART HYD ROSIN | — | 22.1 | 2.4 | — | 26.2 |
| TERPENE RESINS | 25.8 | 3.6 | 5.8 | 27.4 | 1.4 |
| ** FILLER ** | | | | | |
| CALCIUM CARBONATE | 18.6 | — | — | 11.9 | 13.6 |
| TALC | — | 7.3 | 14.8 | — | — |
| ** SOFTENER ** | | | | | |
| HYDROGENATED VEGETABLE OIL | 12.3 | 11.3 | 19.8 | 12.3 | 8.2 |
| GLYCEROL MONOSTEARATE | 4.4 | 4.4 | 2.8 | 4.7 | 5.2 |
| LECITHIN | 4.8 | 3.7 | — | 3.5 | 3.9 |
| TOTAL PERCENT | 100.0 | 100.0 | 100.0 | 100.0 | 100.0 |

EXAMPLES 26–30

| GENERIC INGREDIENTS | IDENTIFICATION - EXAMPLE #: | | | | |
|---|---|---|---|---|---|
| | 26 | 27 | 28 | 29 | 30 |
| ** SYNTHETIC ELASTOMER ** | | | | | |
| STYRENE-BUTADIENE ELASTOMER | — | — | — | — | — |
| BUTYL (ISOPRENE-ISOBUTYLENE) ELASTOMER | 10.0 | 9.2 | 2.4 | 8.3 | 8.8 |
| POLYISOBUTYLENE ELASTOMER | 1.9 | 6.3 | 8.4 | 3.6 | 2.3 |
| POLYVINYL ACETATE | 27.6 | 13.1 | 20.5 | 27.5 | 27.4 |
| ** ELASTOMER PLASTICIZERS ** | | | | | |
| GLYCEROL ESTERS OF ROSIN | — | — | — | — | — |
| GLYCEROL ESTERS OF PART HYD ROSIN | — | 19.9 | — | — | — |
| TERPENE RESINS | 25.3 | — | 23.5 | 25.3 | 28.3 |
| ** FILLER ** | | | | | |
| CALCIUM CARBONATE | 11.3 | 22.3 | — | 11.3 | 12.5 |
| TALC | — | — | 15.6 | — | — |
| ** SOFTENER ** | | | | | |
| HYDROGENATED VEGETABLE OIL | 15.4 | 18.6 | 19.2 | 16.5 | 12.5 |
| GLYCEROL MONOSTEARATE | 4.8 | 10.6 | 8.9 | 4.8 | 4.7 |
| LECITHIN | 3.7 | — | 1.5 | 2.7 | 3.5 |

TABLE 1-continued

Wax-Free Gum Bases
For Use In Chewing Gun Having
Some Reduced Tack Characteristics (Examples 1-30)

| TOTAL PERCENT | 100.0 | 100.0 | 100.0 | 100.0 | 100.0 |
|---|---|---|---|---|---|

When the wax-free gum base of the invention is to be used in a regular (non-bubble) gum which does not have abhesive characteristics, the base should contain about 12 to about 30 weight percent natural elastomer, about 20 to about 40 weight percent synthetic elastomer blend, about 4 to about 25 weight percent elastomer plasticizer, about 5 to about 25 weight percent filler, about 15 to about 30 weight percent softener, 0 to about 1 weight percent colorant and 0 to about 0.1 weight percent antioxidant. Specific embodiments of the wax-free gum base fitting this description are provided in Examples 31-55 below:

TABLE 2

Wax-Free Gum Bases For Use
In Chewing Gum Not Having Reduced Tack (Examples 31-55)

EXAMPLES 31-34

| GENERIC INGREDIENTS | IDENTIFICATION - EXAMPLE #: | | | |
|---|---|---|---|---|
| | 31 | 32 | 33 | 34 |
| ** NATURAL ELASTOMER ** | | | | |
| NATURAL GUM | 22.0 | 26.5 | 23.4 | 25.1 |
| ** SYNTHETIC ELASTOMER ** | | | | |
| STYRENE-BUTADIENE ELASTOMER | | | — | 1.9 |
| BUTYL (ISOPRENE-ISOBUTYLENE) ELASTOMER | 4.8 | 7.1 | 5.6 | 2.1 |
| POLYISOBUTYLENE ELASTOMER | 5.7 | 5.6 | 3.0 | 4.7 |
| POLYVINYL ACETATE | 16.4 | 18.7 | 19.8 | 24.8 |
| ** ELASTOMER PLASTICIZERS ** | | | | |
| GLYCEROL ESTERS OF ROSIN | 3.8 | — | — | 3.2 |
| GLYCEROL ESTERS OF PART HYD ROSIN | 12.3 | 15.3 | 15.9 | 12.6 |
| METHYL ESTERS OF ROSIN | — | — | — | 2.1 |
| TERPENE RESINS | — | — | — | — |
| ** FILLER ** | | | | |
| CALCIUM CARBONATE | — | 4.0 | 10.7 | 4.4 |
| TALC | 7.1 | — | — | — |
| ** SOFTENER ** | | | | |
| HYDROGENATED VEGETABLE OIL | 21.8 | 18.4 | 16.8 | 12.6 |
| GLYCEROL MONOSTEARATE | 6.1 | 4.4 | 4.8 | 3.8 |
| LECITHIN | — | — | — | 2.7 |
| TOTAL PERCENT | 100.0 | 100.0 | 100.0 | 100.0 |

EXAMPLES 35-38

| GENERIC INGREDIENTS | IDENTIFICATION - EXAMPLE #: | | | |
|---|---|---|---|---|
| | 35 | 36 | 37 | 38 |
| ** NATURAL ELASTOMER ** | | | | |
| NATURAL GUM | 22.8 | 18.2 | 23.5 | 17.6 |
| ** SYNTHETIC ELASTOMER ** | | | | |
| STYRENE-BUTADIENE ELASTOMER | 2.6 | — | | |
| BUTYL (ISOPRENE-ISOBUTYLENE) ELASTOMER | 4.1 | 6.9 | 8.8 | 10.2 |
| POLYISOBUTYLENE ELASTOMER | 3.2 | 5.4 | 3.3 | 2.1 |
| POLYVINYL ACETATE | 16.3 | 15.2 | 12.9 | 26.9 |
| ** ELASTOMER PLASTICIZERS ** | | | | |
| GLYCEROL ESTERS OF ROSIN | 6.9 | — | 8.5 | 11.7 |
| GLYCEROL ESTERS OF PART HYD ROSIN | 11.8 | 12.5 | 5.5 | 4.8 |
| METHYL ESTERS OF ROSIN | 1.7 | 2.6 | 1.4 | — |
| TERPENE RESINS | — | — | 3.7 | — |
| ** FILLER ** | | | | |
| CALCIUM CARBONATE | 9.3 | 16.0 | — | — |
| TALC | — | — | 9.3 | 4.6 |
| ** SOFTENER ** | | | | |
| HYDROGENATED VEGETABLE OIL | 18.2 | 16.1 | 16.2 | 15.8 |
| GLYCEROL MONOSTEARATE | — | 7.1 | 5.7 | 6.3 |
| LECITHIN | 3.1 | — | 1.2 | — |
| TOTAL PERCENT | 100.0 | 100.0 | 100.0 | 100.0 |

EXAMPLES 39-42

| GENERIC INGREDIENTS | IDENTIFICATION - EXAMPLE #: | | | |
|---|---|---|---|---|
| | 39 | 40 | 41 | 42 |
| ** NATURAL ELASTOMER ** | | | | |
| NATURAL GUM | 12.9 | 18.5 | 15.7 | 22.6 |
| ** SYNTHETIC ELASTOMER ** | | | | |

TABLE 2-continued

Wax-Free Gum Bases For Use
In Chewing Gum Not Having Reduced Tack (Examples 31–55)

| STYRENE-BUTADIENE ELASTOMER | — | — | 1.9 | — |
|---|---|---|---|---|
| BUTYL (ISOPRENE-ISOBUTYLENE) ELASTOMER | 9.1 | 6.4 | 3.7 | 5.8 |
| POLYISOBUTYLENE ELASTOMER | 9.4 | 5.2 | 4.1 | 3.1 |
| POLYVINYL ACETATE | 10.7 | 15.4 | 26.2 | 20.4 |
| ** ELASTOMER PLASTICIZERS ** | | | | |
| GLYCEROL ESTERS OF ROSIN | 15.2 | — | — | — |
| GLYCEROL ESTERS OF PART HYD ROSIN | — | 13.2 | 15.3 | 11.7 |
| METHYL ESTERS OF ROSIN | — | 2.0 | — | 4.0 |
| TERPENE RESINS | — | — | — | — |
| ** FILLER ** | | | | |
| CALCIUM CARBONATE | 20.6 | 18.5 | 12.2 | 11.6 |
| TALC | — | — | — | — |
| ** SOFTENER ** | | | | |
| HYDROGENATED VEGETABLE OIL | 15.8 | 13.9 | 15.1 | 17.5 |
| GLYCEROL MONOSTEARATE | 6.3 | 6.9 | 5.8 | 3.3 |
| LECITHIN | — | — | — | — |
| TOTAL PERCENT | 100.0 | 100.0 | 100.0 | 100.0 |

EXAMPLES 43–46

| GENERIC INGREDIENTS | IDENTIFICATION - EXAMPLE #: | | | |
|---|---|---|---|---|
| | 43 | 44 | 45 | 46 |
| ** NATURAL ELASTOMER ** | | | | |
| NATURAL GUM | 23.7 | 22.1 | 21.1 | 22.2 |
| ** SYNTHETIC ELASTOMER ** | | | | |
| STYRENE-BUTADIENE ELASTOMER | — | — | — | — |
| BUTYL (ISOPRENE-ISOBUTYLENE) ELASTOMER | 6.2 | 5.7 | 6.1 | 5.7 |
| POLYISOBUTYLENE ELASTOMER | 5.9 | 3.1 | 2.8 | 3.1 |
| POLYVINYL ACETATE | 23.7 | 22.0 | 18.0 | 22.0 |
| ** ELASTOMER PLASTICIZERS ** | | | | |
| GLYCEROL ESTERS OF ROSIN | — | — | 11.3 | 15.7 |
| GLYCEROL ESTERS OF PART HYD ROSIN | 11.3 | 15.2 | — | 13.2 |
| METHYL ESTERS OF ROSIN | 2.9 | — | — | 2.0 |
| TERPENE RESINS | 2.8 | — | — | — |
| ** FILLER ** | | | | |
| CALCIUM CARBONATE | 5.6 | 11.4 | — | 11.3 |
| TALC | — | — | 15.4 | — |
| ** SOFTENER ** | | | | |
| HYDROGENATED VEGETABLE OIL | 12.1 | 17.2 | 15.1 | 17.2 |
| GLYCEROL MONOSTEARATE | 5.8 | 3.3 | 5.8 | 3.3 |
| LECITHIN | — | — | — | — |
| TOTAL PERCENT | 100.0 | 100.0 | 100.0 | 100.0 |

EXAMPLES 47–50

| GENERIC INGREDIENTS | IDENTIFICATION - EXAMPLE | | | |
|---|---|---|---|---|
| | 47 | 48 | 49 | 50 |
| ** NATURAL ELASTOMER ** | | | | |
| NATURAL GUM | 23.8 | 28.4 | 18.7 | 19.5 |
| ** SYNTHETIC ELASTOMER ** | | | | |
| STYRENE-BUTADIENE ELASTOMER | — | — | — | |
| BUTYL (ISOPRENE-ISOBUTYLENE) ELASTOMER | 3.1 | 5.4 | 6.9 | 8.2 |
| POLYISOBUTYLENE ELASTOMER | 7.7 | 3.1 | 5.5 | 2.7 |
| POLYVINYL ACETATE | 20.5 | 26.6 | 14.8 | 17.2 |
| ** ELASTOMER PLASTICIZERS ** | | | | |
| GLYCEROL ESTERS OF ROSIN | — | — | — | 20.0 |
| GLYCEROL ESTERS OF PART HYD ROSIN | 10.4 | 11.4 | 15.5 | — |
| METHYL ESTERS OF ROSIN | 2.0 | — | — | — |
| TERPENE RESINS | 5.1 | — | — | — |
| ** FILLER ** | | | | |
| CALCIUM CARBONATE | — | 9.1 | 17.9 | 9.6 |
| TALC | 5.3 | — | — | — |
| ** SOFTENER ** | | | | |
| HYDROGENATED VEGETABLE OIL | 15.8 | 16.0 | 13.0 | 22.8 |
| GLYCEROL MONOSTEARATE | 6.3 | — | 7.7 | — |
| LECITHIN | — | — | — | — |
| TOTAL PERCENT | 100.0 | 100.0 | 100.0 | 100.0 |

EXAMPLES 51–55

IDENTIFICATION - EXAMPLE #:

TABLE 2-continued

Wax-Free Gum Bases For Use In Chewing Gum Not Having Reduced Tack (Examples 31–55)

| GENERIC INGREDIENTS | 51 | 52 | 53 | 54 | 55 |
|---|---|---|---|---|---|
| ** NATURAL ELASTOMER ** | | | | | |
| NATURAL GUM | 14.4 | 18.2 | 25.2 | 25.2 | 26.7 |
| ** SYNTHETIC ELASTOMER ** | | | | | |
| STYRENE-BUTADIENE ELASTOMER | — | — | — | — | — |
| BUTYL (ISOPRENE-ISOBUTYLENE) ELASTOMER | 9.1 | 6.8 | 2.4 | 3.5 | 3.2 |
| POLYISOBUTYLENE ELASTOMER | 3.6 | 5.4 | 4.9 | 5.7 | 6.1 |
| POLYVINYL ACETATE | 18.1 | 15.5 | 19.9 | 19.1 | 17.6 |
| ** ELASTOMER PLASTICIZERS ** | | | | | |
| GLYCEROL ESTERS OF ROSIN | 11.9 | — | 15.6 | — | — |
| GLYCEROL ESTERS OF PART HYD ROSIN | 13.0 | 12.7 | — | 15.6 | 15.6 |
| METHYL ESTERS OF ROSIN | — | 2.6 | — | — | — |
| TERPENE RESINS | — | — | 2.1 | 1.9 | — |
| ** FILLER ** | | | | | |
| CALCIUM CARBONATE | 14.1 | 15.7 | — | — | — |
| TALC | — | — | 7.1 | 6.2 | 8.0 |
| ** SOFTENER ** | | | | | |
| HYDROGENATED VEGETABLE OIL | 15.8 | 16.0 | 18.4 | 18.4 | 18.4 |
| GLYCEROL MONOSTEARATE | — | 7.1 | 4.4 | 4.4 | 2.8 |
| LECITHIN | — | — | — | — | 1.6 |
| TOTAL PERCENT | 100.0 | 100.0 | 100.0 | 100.0 | 100.0 |

When the wax-free gum base of the invention is to be used in a bubble gum, the base should contain about 30 to about 60 weight percent synthetic elastomer, about 5 to about 55 weight percent elastomer plasticizer, about 10 to about 35 weight percent filler, about 5 to about 25 weight percent softener, 0 to about 1 weight percent colorant and 0 to about 0.1 weight percent antioxidant. Specific embodiments of the wax-free base for use in bubble gum are provided in Examples 56–74 below.

TABLE 3

Wax-Free Gum Bases For Use In Bubble Gum

EXAMPLES 56–60

| GENERIC INGREDIENTS | IDENTIFICATION - EXAMPLE #: | | | | |
|---|---|---|---|---|---|
|  | 56 | 57 | 58 | 59 | 60 |
| ** SYNTHETIC ELASTOMER ** | | | | | |
| POLYISOBUTYLENE ELASTOMER | 17.1 | 16.7 | 11.7 | 6.2 | 11.6 |
| POLYVINYL ACETATE | 24.9 | 25.6 | 29.4 | 30.9 | 31.5 |
| ** ELASTOMER PLASTICIZERS ** | | | | | |
| GLYCEROL ESTERS OF ROSIN | 6.8 | 8.0 | 10.7 | 14.6 | 19.8 |
| GLYCEROL ESTERS OF PART HYD ROSIN | — | — | — | — | — |
| ** FILLER ** | | | | | |
| CALCIUM CARBONATE | — | — | — | — | — |
| TALC | 34.7 | 34.9 | 34.1 | 34.0 | 21.9 |
| ** SOFTENER ** | | | | | |
| GLYCERYL TRIACETATE | 4.6 | 3.9 | 4.4 | 4.7 | 5.0 |
| GLYCEROL MONOSTEARATE | 5.8 | 5.7 | 4.3 | 4.6 | 4.9 |
| ACETYLATED MONOGLYCERIDE | 6.1 | 5.2 | 5.4 | 5.0 | 5.3 |
| TOTAL PERCENT | 100.0 | 100.0 | 100.0 | 100.0 | 100.0 |

EXAMPLES 61–64

| GENERIC INGREDIENTS | IDENTIFICATION - EXAMPLE #: | | | |
|---|---|---|---|---|
|  | 61 | 62 | 63 | 64 |
| ** SYNTHETIC ELASTOMER ** | | | | |
| POLYISOBUTYLENE ELASTOMER | 15.7 | 13.2 | 5.4 | 7.9 |
| POLYVINYL ACETATE | 32.1 | 33.2 | 34.8 | 34.2 |
| ** ELASTOMER PLASTICIZERS ** | | | | |
| GLYCEROL ESTERS OF ROSIN | 27.4 | 22.6 | 16.3 | 14.8 |
| GLYCEROL ESTERS OF PART HYD ROSIN | — | — | — | — |
| ** FILLER ** | | | | |
| CALCIUM CARBONATE | — | — | 30.2 | 29.8 |
| TALC | 10.1 | 17.3 | — | — |
| ** SOFTENER ** | | | | |
| GLYCERYL TRIACETATE | 4.9 | 5.0 | 5.3 | 5.3 |
| GLYCEROL MONOSTEARATE | 4.7 | 4.1 | 5.9 | 5.0 |
| ACETYLATED MONOGLYCERIDE | 5.1 | 4.6 | 2.1 | 3.0 |
| TOTAL PERCENT | 100.0 | 100.0 | 100.0 | 100.0 |

EXAMPLES 65–69

TABLE 3-continued

Wax-Free Gum Bases For Use In Bubble Gum

| GENERIC INGREDIENTS | IDENTIFICATION - EXAMPLE #: | | | | |
|---|---|---|---|---|---|
| | 65 | 66 | 67 | 68 | 69 |
| ** SYNTHETIC ELASTOMER ** | | | | | |
| POLYISOBUTYLENE ELASTOMER | 17.2 | 13.0 | 11.6 | 11.6 | 7.9 |
| POLYVINYL ACETATE | 37.3 | 37.1 | 39.9 | 41.2 | 34.2 |
| ** ELASTOMER PLASTICIZERS ** | | | | | |
| GLYCEROL ESTERS OF ROSIN | 11.2 | — | — | — | — |
| GLYCEROL ESTERS OF PART HYD ROSIN | — | 19.8 | 19.9 | 19.4 | 14.8 |
| ** FILLER ** | | | | | |
| CALCIUM CARBONATE | 20.6 | 16.5 | 15.0 | — | 29.8 |
| TALC | — | — | — | 14.0 | — |
| ** SOFTENER ** | | | | | |
| GLYCERYL TRIACETATE | 5.6 | 5.6 | 6.0 | 6.2 | 5.3 |
| GLYCEROL MONOSTEARATE | 8.1 | 8.0 | 7.6 | 7.6 | 5.0 |
| ACETYLATED MONOGLYCERIDE | — | — | — | — | 3.0 |
| TOTAL PERCENT | 100.0 | 100.0 | 100.0 | 100.0 | 100.0 |

EXAMPLES 70-74

| GENERIC INGREDIENTS | IDENTIFICATION - EXAMPLE #: | | | | |
|---|---|---|---|---|---|
| | 70 | 71 | 72 | 73 | 74 |
| ** SYNTHETIC ELASTOMER ** | | | | | |
| POLYISOBUTYLENE ELASTOMER | 11.6 | 10.9 | 11.6 | 12.4 | 11.9 |
| POLYVINYL ACETATE | 37.8 | 37.5 | 31.4 | 31.0 | 37.0 |
| ** ELASTOMER PLASTICIZERS ** | | | | | |
| GLYCEROL ESTERS OF ROSIN | — | — | — | — | — |
| GLYCEROL ESTERS OF PART HYD ROSIN | 19.8 | 20.6 | 19.8 | 21.1 | 20.3 |
| ** FILLER ** | | | | | |
| CALCIUM CARBONATE | — | — | — | — | — |
| TALC | 17.0 | 19.5 | 22.7 | 22.2 | 16.7 |
| ** SOFTENER ** | | | | | |
| GLYCERYL TRIACETATE | 5.6 | 5.2 | 5.8 | 4.3 | 5.7 |
| GLYCEROL MONOSTEARATE | 3.2 | 3.1 | 2.9 | 2.5 | 4.5 |
| ACETYLATED MONOGLYCERIDE | 5.0 | 3.2 | 5.8 | 6.5 | 3.9 |
| TOTAL PERCENT | 100.0 | 100.0 | 100.0 | 100.0 | 100.0 |

The wax-free gum base of the invention constitutes about 5-95 weight percent of the chewing gum, more typically 10-50 weight percent of the chewing gum, and most commonly 20-35 weight percent of the chewing gum. The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making base is typical, slight modifications can be practiced to reach the preferred gum bases providing the improved wax-free chewing gum with initial soft bite.

For example, at least two or more elastomers may be blended in a particular gum base. These blended elastomer gum bases may include at least two, or more, of the synthetic elastomers selected from the group consisting of styrene-butadiene copolymer, polyisoprene, polyisobutylene, and isobutylene-isoprene copolymer (referred to as butyl elastomer).

These synthetic elastomers have been described earlier. Their blending in the gum bases requires their sequential addition to the mixer, in any sequence selected by the operator, but may be enhanced in the initial blends by the presence in the mixer/blender of at least a portion of the elastomer plasticizer, the vinyl polymer, i.e. polyvinylacetate, and optionally, at least some portion of the softeners, particularly the hydrogenated vegetable oils and/or the triacetin, lecithin, or glycerol monostearate.

The preferred blend of synthetic elastomers is the blend containing from about 0-20 percent SBR copolymer, 20-80 percent PIB elastomer, and 5-40 percent butyl elastomer, and from about 10 to about 60 percent polyvinylacetate.

It has also been found that there is a preferred method for making the bubble bases described in this invention.

First, all of the polyvinylacetate and portions of the polyisobutylene and filler are added and blended in a heated sigma blade mixer. Softeners such as vegetable oils, glycerol triacetate, glycerol monostearate and/or acetylated monoglyceride are then added along with a second portion of each of polyisobutylene (or other elastomers) and filler. Acetylated monoglyceride or other selected softeners may be added at the end of the process if desired and still not alter the chewing texture of the gum made from the base.

Next, the rest of the polyisobutylene (or other elastomers selected) and filler are added along with the elastomer plasticizer. Finally, the remaining ingredients such as glycerol monostearate and antioxidants may be added. Colorant may be added at any time during the mixing process and is preferably added at the start.

There are some variations to the above described preferred method which in no way limits the method as described. Those skilled in the art of gum base manufacture may be able to appreciate any minor variations.

In producing wax-containing gum bases high in polyvinylacetate, and particularly those high in high molecular weight polyvinylacetate, it is advantageous to improve blending of the ingredients by removing the heat applied to the sigma blade mixer at some point in the process. This reduces the temperature of the gum base and causes greater compatibility of its ingredients. In the inventive gum base process for making the inventive gum base free of wax, there is no need to remove the heat applied. The degree of incompatibility is greatly reduced since there is no wax present. Nevertheless, heat is preferably removed at about 30 minutes to about 90 minutes into the mixing time of the base production process.

In addition to the water-insoluble gum base, a typical chewing gum composition includes a water soluble bulk portion and one or more flavoring agents. The wax-free gum base of the invention can be used in any typical chewing gum composition.

THE IMPROVED WAX-FREE CHEWING GUMS

The water soluble bulk portion of the chewing gum may include softeners, bulk sweeteners including high intensity and low intensity sweeteners, binding agents, flavoring agents and combinations thereof. Water soluble or water dispersible softeners are added to the chewing gum in order to optimize the chewability and mouth feel of the gum, and to help achieve the initial soft bite of the improved wax-free chewing gums of this invention. These softeners can be the same or very similar to the softeners used to make the gum base, but these softeners are preferably not oil soluble compounds, for example, the vegetable oil softeners of the gum base. The softeners, which are also known as plasticizers or plasticizing agents, generally constitute between about 0.5-15% by weight of the chewing gum. The water soluble/water dispersible softeners may include glycerin, lecithin, glycerol monostearate, hydroxylated lecithin, agar, carrageenan, and combinations thereof. They may not necessarily be completely soluble in water, but may themselves be dispersible in water, or be made dispersible in water by use of emulsifiers.

Aqueous sweetener solutions such as those containing sorbitol, hydrogenated starch hydrolysates, corn syrup and combinations thereof, may also be used as softeners and binding agents in chewing gum. Certain glycerin coevaporated syrups may be preferred.

Bulk sweeteners constitute between about 5-95% by weight of the chewing gum, more typically 10 to 90% by weight of the chewing gum and most commonly 30-70% by weight of the chewing gum. Bulk sweeteners may include either sugar or sugarless sweeteners and components, or both. Sugar sweeteners may include saccharide containing components including but not limited to sucrose, dextrose, maltose, dextrin, dried invert sugar, fructose, levulose, galactose, corn syrup solids, high maltose syrup, invert/high fructose syrup, maltotriose, glyceraldehyde, erythrose, xylose, lactose, leucrose, L- sugars, fructooligosaccharide and low calorie bulking agents such as indigestible dextrin, guar gum hydrolyzate, oligofructose, polydextrose, and the like, alone or in combination.

Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, lactitol, erythritol, cellobiitol, and the like, alone or in combination.

High intensity sweeteners may also be present and are commonly used with sugarless sweeteners. When used, high intensity sweeteners typically constitute between 0.001-5.0% by weight of the chewing gum, preferably between 0.01-1.0% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, stevia and the like, alone or in 3 combination.

Sweeteners, particularly high intensity sweeteners, can be incorporated into chewing gum after being modified or encapsulated in Order to modify their release. The most common ways of modifying the release of the active ingredients include spray drying, spray chilling, fluid-bed coating, coacervation, absorption, extrusion encapsulation, and other standard encapsulating techniques.

Combinations of sugar and/or sugarless sweeteners may be used in chewing gum. The sweetener may also function in the chewing gum in whole or in part as a water soluble bulking agent. Additionally, the sweetener may also provide additional binding such as with aqueous sugar or alditol syrups/solutions.

Flavoring agents should generally be present in the chewing gum in an amount within the range of about 0.1-15% by weight of the chewing gum, preferably between about 0.2-5% by weight of the chewing gum, most preferably between about 0.5-3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, food acidulants emulsifiers, pharmaceutical agents, vitamins, and additional flavoring agents may also be included in chewing gum.

The preferred and improved wax-free chewing gums of the invention have been formulated to have an initial soft bite, to set-up or temper rapidly during production, and to achieve more efficient production yields. To accomplish each of their goals, the gum bases are preferably formulated with blends of synthetic elastomers, particularly blends of the preferred three or four elastomers discussed above. These elastomers, SBR, PIB, and butyl elastomer and polyvinylacetate are contained in the gum base, which base may also contain the other ingredients earlier described.

These gum bases are then blended with water soluble bulk ingredients and flavors to achieve the improved wax-free chewing gums, bubble gums, or specialty gums of the invention.

The removal of mineral wax from a chewing gum causes several problems. Since wax acts as a binder, additional binders or ways to bind ingredients together are needed. One way is to increase the level of syrups, but this is not particularly of choice when a sugar-free, sugarless, or low-calorie chewing gum is to be the end product. Another way is to increase the level of total elastomer.

Wax also contributes to chewing characteristics in gums. Depending on the melting point of the wax, the wax can contribute to soft chew or to firm or hard chew. The prior art often blended waxes to achieve some aspects of both.

Wax also tended to retain flavors in a way that would not provide flavoring ingredients to the customer during the chew. Wax-free gums have been found to release flavor more rapidly, and more efficiently over the life of the chew.

Some wax-free gums have had a tendency to be flaccid, not having good initial soft bite nor cohesiveness and having a tendency to fall apart during the chew. The improved wax-free gums of the invention have an initial soft bite, good cohesiveness, have improved flavor and sweetener release, and can be manufactured more quickly and more efficiently.

The improved chewing gums are particularly enjoyable and effectively manufactured by their use of the multiple elastomer gum bases. The bases contain polyvinylacetate and selected elastomer plasticizers and selected softeners and fillers.

The selected elastomer plasticizers are those plasticizers demonstrated in Examples 1–74, and the selected fats, oils and softeners are those fats, oils and softeners demonstrated in Examples 1–74. Particularly good results are found with gum bases containing PIB, butyl rubbers, and SBR elastomers, in the presence of polyvinylacetate, and optionally certain natural elastomers. The bases also advantageously contain glycerol esters of rosin, glycerol esters of partially hydrogenated rosin, terpene resins, or mixtures thereof, and may also contain methyl or ethyl esters of Rosin.

The bases also advantageously contain fats, oils and softeners preferably selected from the group consisting of hydrogenated vegetable oil, partially hydrogenated vegetable oils, glycerol monostearate, glycerol triacetate, lecithin, and/or mixtures thereof. Bubble gums according to the invention normally contain higher concentrations of polyvinylacetate and lower amounts of fats and oils, particularly the hydrogenated vegetable oils, but still contain the other softeners. Attention is drawn to the gum bases, Examples 1–74.

The multiple elastomer gum bases with polyvinylacetate, selected elastomer plasticizers and softeners (and fillers) are blended with water soluble ingredients and flavors.

Slight decreases in concentration of certain flavors, compared to wax containing gums, are possible with the wax-free gums.

Improved binders are also advantageous in these wax-free gums. Total binder content can be increased from about 1.0 to about 10 percent, relative to wax containing gums. This may be dependent on the final product and whether it contains sugar or is essentially sugar free. Binders can include corn syrup, glycerin coevaporated hydrogenated starch hydrolyzate (HSH) syrup, preferably coevaporated LYCASIN containing 25 percent glycerin, 7.5 percent water, and 67.5 percent HSH solids (all by weight) or other sugar or sugar alcohol syrups/solutions.

The improved gum bases of this invention provide improved wax-free chewing gums having initial softbite. Preferably, the wax-free gums contain low-moisture, that is between 0.1 weight percent to about 2.0 weight percent water.

Chewing gum is generally manufactured by sequentially adding the various chewing gum base, water soluble bulk portion and flavor ingredients to any commercially available mixer known in the art. After the ingredients have been thoroughly mixed, the gum mass is discharged from the mixer and shaped into the desired form. Generally, the ingredients are mixed by first melting and filtering the gum base and adding it to the running mixer. The gum base may alternatively be melted in the mixer. Color and emulsifiers can be added at this time.

A preferred water soluble softener, such as glycerin, can be added next along with a binding syrup and part of the bulk portion. Further parts of the bulk portion (for example sucrose or xylitol) may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed. A gum loaf is formed as the chewing gum mixture is discharged from the mixer. The wax-free loaf obtained with our invention is cured or tempered for less than 15 minutes and then fed to an extruder. The extruder inlet temperature is about 40°±5° C. and the outlet temperature is about 60°±5° C. The extruder outlet extrudes an essentially continuous chewing gum strip or rope, and when the final product is a stick gum or a pelleted gum, the extruder is set to form a ribbon, said ribbon having a thickness of from about 0.5–3.0 inches and a width of from about 12–25 inches.

The chewing gum ribbon can be dusted with various substances to reduce the stickiness and improve the initial taste of the gum. The materials used to dust the chewing gum are referred to as "dusting compounds" or, alternatively "rolling compounds", because the compounds are used to make the gum ribbon more manageable during processing including rolling and sheeting. The rolling compound used can be selected from the group consisting of sucrose, mannitol, starch, calcium carbonate, talc, lactitol, palatinit (hydrogenated isomaltulose), lactose, and combinations thereof. To improve the flavor impact and duration of the gum, flavor, gum base, and sweetener can be added to the rolling compound.

The dusted ribbon, having been treated with rolling compound, then undergoes multiple passages through at least one and preferably several sets of counter-rotating reducing rollers and finishing rollers. This operation greatly elongates the ribbon and decreases its thickness to desired end product thickness. For stick gum, this ranges from about 0.05 to about 0.10 inches, preferably from about 0.06 to about 0.08 inches, and for pellet gum, this ranges from about 0.150 to about 0,300 inches, preferably from about 0.18 to 0.25 inches.

The ribbon is then scored and cut, further tempered for from about 6–24 hours, and wrapped, or in the case of finished pelleted gum, coated and packaged. A wax containing gum requires from 24–48 hours to temper to a toughness required to undergo wrapping. The new wax-free gums only require 6–24 hours, and when stick gum is made, tempering time is from about 6–12 hours.

Chewing gum products contemplated as part of the present invention have an initial soft bite and are simultaneously tough enough to be tempered quickly and wrapped quickly.

Initial soft bite is normally a characteristic of chewing gums which do not have good toughness. Wax containing gums with soft bite are often fragile, require extended tempering times, require increased trim gum recycle, and are difficult to wrap, because the gum is not tough. This extends production time as much as 20-24 hours, relative to these new products.

Soft bite is believed to be related to Taber Stiffness. Gum stiffness may be measured by the Taber V-5 Stiffness Testor Method, such method using the Taber Testor, Model 150 B, available from Taber Instrument Corporation, North Tonawanda, New York.

Taber Stiffness is a measure of the chewing gums resistance to bending. The lower the Taber Stiffness measurement, the softer the initial bite.

Gum toughness is a concept primarily useful in attempting to judge the ease of machine handling a sheet or card of processed flattened chewing gum ribbon, particularly as the gum ribbon is further processed to gum sheets and gum sticks and then wrapped.

If a gum does not have good toughness, the handling of the gum sheets, gum cards, or sticks can cause bending, or premature stick separation, and this can delay wrapping and cause production down-time.

The wax-free gums of the invention have softer initial bite as measured by a Taber Stiffness at least 5 percent less than that of comparable wax containing chewing gums, and still .provide adequate toughness for wrapping. In fact, the wax-free gums of the invention provide a good surface toughness and, in spite of the good initial softness can be processed, tempered, and wrapped in at least 10 to about 60 percent of the time required for a comparable wax containing gum.

The gums also have lower Instron yields, another measure of softness. The Instron yields of our gum are normally about 0.02 to about 0.08 pound-inches. However, Instron data can be outside this range, but are at least 5 percent below those for comparable wax gums.

These unique physical characteristics of soft bite and good surface toughness with fast set-up time (sometimes referred to as tempering time), good elastic memory, and the ability of the chewing gums of this invention to be processed more efficiently, with less waste, lower requirement for trim gum, allow these gums to be processed to a final wrapped product in from about 10 percent to up to about 60 percent of the time required for a comparable wax containing chewing gum.

The chewing gum products available with the improved wax-free chewing gum bases and formulations are generally similar to products using traditional wax containing bases. Many general types of products can be produced including reduced tack gums, sugarless gums, bubble gums (sugarless or sugar-containing), coated ball or pellet gums (sugarless or sugar-containing), dental health gums, breath freshening gums, novelty gums, low calorie gums and pharmaceutical gums. The products may be of any flavor, and may be processed in a variety of ways in either batch or continuous processes, and formed into any final shape including sticks, tabs, chunks, tapes, coextruded products, molded shapes, etc.

The following formulas are illustrative of types of products which may be produced. All ingredient levels are expressed in weight percent.

Examples 75-98 illustrate non-tack and reduced-tack chewing gums of the present invention. As can be seen, there is much latitude in the selection of flavors sweeteners and ingredient levels. Examples 75-86 illustrate use of the invention with sugar gums while Examples 87-98 describe sugarless gums. Encapsulated sweeteners are used to extend sweetness and flavor and to protect the artificial sweetener from degradation during storage. Examples 89 and 91 are low moisture products having moisture levels below 2%.

TABLE 4

Sugar-Containing Non-Tack And Reduced Tack Gums

EXAMPLES 75-80

| Example | 75 | 76 | 77 | 78 | 79 | 80 |
|---|---|---|---|---|---|---|
| Base Example # | 19 | 17 | 11 | 19 | 16 | 16 |
| Base % | 20.12 | 23.20 | 27.20 | 21.22 | 22.10 | 24.00 |
| Flavor | 0.20 (Spray Dried Peppermint) | 1.10 (Cinnamon) | 1.55 (Wintergreen) | 0.10 (Spray Dried Menthol) | 0.10 (Peppermint) | 0.90 (Peppermint) |
| Flavor | 0.91 (Spearmint) | | 0.10 (Spray Dried Menthol) | 0.85 (Spearmint) | 0.90 (Spearmint) | 0.10 (Spearmint) |
| Sugar | 58.70 | 60.96 | 55.80 | 60.60 | 60.34 | 61.29 |
| Sorbitol | 1.20 | 0.68 | | 0.68 | 0.70 | |
| Encapsulated Acesulfame K | 0.10 | 0.30 | | 0.30 | 0.41 | |
| Encapsulated Aspartame | 0.10 | | | | | |
| Calcium Carbonate | 3.10 | | | | | |
| Corn Syrup* | 13.47 | 12.11 | 13.71 | 14.80 | 14.00 | 12.10 |
| Lecithin | | 0.15 | 0.10 | 0.15 | 0.15 | 0.20 |
| Glycerin | 2.10 | 1.50 | 1.54 | 1.30 | 1.30 | 1.41 |
| TOTAL | 100 | 100 | 100 | 100 | 100 | 100 |

*A low moisture chewing gum may be manufactured by substituting for the corn syrup, the glycerin evaporated Lycasin, or glycerin-HSH syrups earlier described.

EXAMPLES 81-86

| Example | 81 | 82 | 83 | 84 | 85 | 86 |
|---|---|---|---|---|---|---|
| Base Example # | 6 | 11 | 20 | 22 | 13 | 16 |

TABLE 4-continued

| Sugar-Containing Non-Tack And Reduced Tack Gums | | | | | | |
|---|---|---|---|---|---|---|
| Base % | 18.72 | 22.81 | 26.01 | 19.35 | 26.00 | 24.77 |
| Flavor | 0.81 (Fruit Flavor) | 1.11 (Peppermint) | 0.97 (Spearmint Oil) | 1.21 (Cinnamon Flavor) | 1.30 (Fruit Flavor) | 1.21 (Wintergreen Flavor) |
| Flavor | | | 0.12 (Peppermint Oil) | 0.13 (Peppermint Oil) | | |
| Sugar | 57.25 | 54.86 | 51.10 | 60.31 | | 51.86 |
| Palatinose | | | | | 49.86 | |
| Corn Syrup* | 14.26 | 11.88 | 13.70 | 14.08 | 15.07 | 13.62 |
| Dextrose | 7.28 | 8.11 | 6.37 | 3.56 | 6.11 | 7.41 |
| Lecithin | 0.13 | 0.12 | 0.10 | | 0.05 | 0.10 |
| Glycerol Monostearate | 0.40 | | 0.61 | | | |
| Glycerin | 1.15 | 1.11 | 1.02 | 1.37 | 1.61 | 1.04 |
| TOTAL | 100 | 100 | 100 | 100 | 100 | 100 |

*A low moisture chewing gum can be manufactured by substituting glycerin coevaporated Lycasin for the corn syrup.

TABLE 5

| Sugarless Non-Tack And Reduced Tack Gums EXAMPLES 87-92 | | | | | | |
|---|---|---|---|---|---|---|
| Example | 87 | 88 | 89 | 90 | 91 | 92 |
| Base Example # | 3 | 19 | 7 | 24 | 24 | 8 |
| Base % | 24.00 | 27.11 | 21.21 | 29.48 | 22.58 | 18.11 |
| Flavor | 1.07 (Citrus Oils) | 0.98 (Peppermint) | 0.97 (Spearmint Oil) | 1.15 (Peppermint Oil) | 1.47 (Cinnamon Flavor) | 1.00 (Wintergreen Oil) |
| Flavor | | 0.20 (Spray Dried Menthol) | 0.15 (Peppermint Oil) | 0.21 (Spearmint Oil) | | 0.27 (Peppermint Oil) |
| Sorbitol | 51.00 | 55.06 | 66.70 | 65.16 | 48.00 | 57.53 |
| Calcium Carbonate | | | 2.11 | | 2.00 | 4.70 |
| Sorbitol Solution | 6.42 | | | | | |
| Coevaporated Lycasin (7.5% water, 25% glycerin) | 10.37 | 9.16 | 4.00 | 8.11 | 12.01 | 8.88 |
| Glycerin | 4.70 | 4.11 | 12.11 | 3.11 | 11.61 | 7.10 |
| Mannitol | 2.10 | 3.10 | 3.11 | 2.66 | 2.00 | 2.00 |
| Encapsulated Aspartame | 0.19 | | 0.25 | | | 0.21 |
| Free Aspartame | 0.05 | | 0.10 | | | 0.10 |
| Encapsulated Aspartame | | 0.05 | | 0.10 | | |
| Free Alitame | | | | 0.03 | | |
| Encapsulated Sucralose | | | | | 0.21 | |
| Free Sucralose | | 0.08 | | | 0.02 | |
| Lecithin | 0.10 | 0.15 | 0.20 | | 0.10 | 0.10 |
| TOTAL | 100 | 100 | 100 | 100 | 100 | 100 |

TABLE 6

| Reduced And Regular Tack Low Calorie Gums EXAMPLES 93-98 | | | | | | |
|---|---|---|---|---|---|---|
| Example | 93 | 94 | 95 | 96 | 97 | 98 |
| Base Example # | 6 | 3 | 19 | 13 | 52 | 44 |
| Bass % | 19.2 | 24.7 | 19.2 | 24.0 | 19.2 | 19.2 |
| Sorbitol | | 6.0 | | | | |
| Mannitol | | 1.0 | | | | |
| Corn Syrup* | | | 6.0 | 24.6 | 18.5 | 6.0 |
| Dextrose | | | 10.0 | 10.0 | 10.0 | |
| Lactose | | | 5.0 | | | 5.0 |
| Glycerin | 2.0 | 16.4 | 8.9 | 0.4 | 1.4 | 8.9 |
| Lecithin | | 0.2 | | | | |
| Flavor | 1.0 | 1.4 | 0.9 | 1.0 | 0.9 | 0.9 |

TABLE 6-continued

Reduced And Regular Tack Low Calorie Gums
EXAMPLES 93–98

| Example | 93 | 94 | 95 | 96 | 97 | 98 |
|---|---|---|---|---|---|---|
| Oligofructose | | | 50.0 | 50.0 | | |
| Fructooligosaccharide | | | | | 50.0 | 50.0 |
| Color | | 0.05 | | | | |
| Aspartame | | 0.25 | | | | |
| High Mol. Weight Indigestible Dextrin | 57.8 | | | | | |
| Low Mol. Weight Indigestible Dextrin | | 50.0 | | | | |
| Indigestible Dextrin Syrup** | 20.0 | | | | | |
| TOTAL | 100 | 100 | 100 | 100 | 100 | 100 |

*Corn syrup may be partially or wholly substituted by glycerin coevaporated Lycasin.
**Indigestible dextrin syrup may also be coevaporated with glycerin to achieve a softener/binder for use in the gums of this invention.

Examples 99–104 are sugarless products made with the non-reduced-tack bases of the present invention. Examples 105–110 are equivalent sugar products.

TABLE 7

Regular Tack Sugarless Gums
EXAMPLES 99–104

| Example | 99 | 100 | 101 | 102 | 103 | 104 |
|---|---|---|---|---|---|---|
| Base Example # | 32 | 44 | 51 | 36 | 52 | 44 |
| Base % | 21.76 | 22.07 | 24.00 | 20.97 | 26.00 | 20.08 |
| Flavor | 0.92 (Pepperment Oil) | 0.77 (Spearmint Oil) | 0.83 (Spearmint Oil) | 0.99 (Cinnamon Flavor) | 0.97 (Peppermint Oil) | 1.04 (Peppermint Oil) |
| Flavor | | 0.24 (Peppermint Oil) | | | | 0.16 (Spray Dried Menthol) |
| Sorbitol | 46.54 | | | 63.61 | 51.50 | |
| Coevaporated Lyeasin (7.5% Water, 25% Glycerin) | 8.47 | 7.64 | 11.20 | 7.76 | | |
| Glycerin | 5.19 | 4.91 | 2.10 | 4.20 | 12.00 | |
| Mannitol | 1.77 | | | 2.01 | 3.11 | |
| Xylitol | 15.11 | | 12.11 | | 6.27 | 78.16 |
| Palatinit (Hydrogenated Isomaltulose) | | 63.97 | 49.60 | | | |
| Aspartame | | | | 0.14 | | 0.14 |
| Encapsulated Aspartame | | | | 0.22 | | 0.22 |
| Alitame | | 0.02 | 0.02 | | | |
| Encapsulated Alitame | | 0.04 | 0.04 | | | |
| Sucralose | 0.11 | | | | 0.15 | |
| Lecithin | 0.13 | 0.14 | 0.10 | 0.10 | | 0.20 |
| TOTAL | 100 | 100 | 100 | 100 | 100 | 100 |

TABLE 8

Regular Tack Sugar Gums
EXAMPLES 105–110

| Example | 105 | 106 | 107 | 108 | 109 | 110 |
|---|---|---|---|---|---|---|
| Base Example # | 57 | 52 | 44 | 39 | 51 | 40 |
| Base % | 22.38 | 20.60 | 20.08 | 23.11 | 20.02 | 21.01 |
| Flavor | 0.89 (Peppermint Oil) | 0.58 (Spearmint Oil) | 0.86 (Peppermint Oil) | 0.91 (Peppermint Oil) | 1.21 (Fruit Flavor) | 0.98 (Wintergreen Flavor) |
| Flavor | | | | 0.21 (Spearmint | | 0.20 (Spray Dried |

TABLE 8-continued

| | Regular Tack Sugar Gums EXAMPLES 105-110 | | | | | |
|---|---|---|---|---|---|---|
| Example | 105 | 106 | 107 | 108 | 109 | 110 |
| | | | | Oil) | | Menthol) |
| Encapsulated Aspartame | | | | 0.10 | | |
| Encapsulated Acesulfame K | | | | | 0.15 | |
| Sucralose | | | | | | 0.09 |
| Sugar | 58.39 | 59.49 | 62.66 | 59.97 | 63.59 | 62.51 |
| Corn Syrup* | 17.20 | 1 8.50 | 15.40 | 14.70 | 13.88 | 14.19 |
| Glycerin | 1.09 | 0.83 | 1.00 | 1.00 | 1.05 | 1.02 |
| Lecithin | 0.05 | | | | .10 | |
| TOTAL | 100 | 100 | 100 | 100 | 100 | 100 |

*Corn syrup may be partially or completely substituted for by use of glycerin coevaporated HSH (Lycasin) syrups.

Examples 111–122 are examples of inventive coated pellet gums made with non-wax bases. The gum products of these examples are formed into pellets or balls for subsequent coating. Examples 111–116 are sugar pellets which could be coated with sugar syrups. Such syrups may contain modified starch (0 to 6.0%), compatible flavors and colors (0 to 0.30%), vegetable gums such as gum arabic and cellulose derivatives such as hydroxypropyl methyl cellulose (0 to 20%) in addition to sucrose or starch hydrolysate in an aqueous solution.

Examples 117–122 are sugarless pellets which can be coated with sugar alcohol solutions such as those of sorbitol, xylitol and palatinit. These syrups may also contain the same modifiers listed above for sugar syrups.

In both cases (sugar and sugarless) dry coating agent (sugar or sugar alcohol) may be added between layers of coating syrup, a process known as dry charging or soft panning.

Coating may be carried out by any suitable process, most often using a conventional pan, side vented pans, high capacity pans such as those made by Driam or Dumouline, or by continuous panning techniques.

TABLE 9

| | Sugar Pellet Gums For Coating EXAMPLES 111-116 | | | | | |
|---|---|---|---|---|---|---|
| Example | 111 | 112 | 113 | 114 | 115 | 116 |
| Base Example # | 40 | 36 | 37 | 51 | 52 | 47 |
| Base % | 24.32 | 24.28 | 24.30 | 24.27 | 25.17 | 24.33 |
| Flavor | 0.55 (Spearmint Oil) | 0.73 (Peppermint Oil) | 2.56 (Licorice Powder) | 0.77 (Fruit Flavor) | 0.47 (Spearmint Oil) | 0.61 (Spearmint Oil) |
| Flavor | | | 0.60 (Menthol/ Anethol | | 0.15 (Peppermint Oil) | |
| Sugar | 52.97 | 52.87 | 50.94 | 52.85 | 52.59 | 52.84 |
| Corn Syrup* | 22.16 | 22.12 | 21.60 | 22.11 | 21.62 | 22.22 |
| TOTAL | 100 | 100 | 100 | 100 | 100 | 100 |

*Corn syrup may contain a portion of glycerin coevaporated Lycasin. Corn syrup may also be high solids corn syrup or corn syrup solids.

TABLE 10

| | Sugarless Pellet Gums For Coating EXAMPLES 117-122 | | | | | |
|---|---|---|---|---|---|---|
| Example | 117 | 118 | 119 | 120 | 121 | 122 |
| Base Example # | 33 | 26 | 40 | 29 | 35 | 35 |
| Base % | 31.01 | 33.00 | 32.71 | 33.03 | 30.97 | 31.45 |
| Flavor | 1.20 (Spearmint Oil) | 1.30 (Peppermint Oil) | 1.09 (Spearmint Oil) | 1.50 (Fruit Flavor) | 1.01 (Peppermint Oil) | 1.31 (Fruit Flavor) |
| Flavor | | 0.50 (Menthol) | 0.17 (Peppermint Oil) | 0.50 (Lemon Flavor) | 0.21 (Spray Dried Menthol) | |
| Sorbitol | 51.46 | 44.06 | 45.56 | 43.81 | 46.69 | 45.99 |
| Calcium Carbonate | 10.01 | 13.00 | 12.16 | 12.93 | 13.04 | 13.33 |
| Glycerin | 6.14 | 8.00 | 8.00 | 7.98 | 7.82 | 7.30 |
| Encapsulated Aspartame | 0.12 | 0.14 | 0.21 | 0.25 | 0.18 | 0.62 |
| Free Aspartame | 0.06 | | 0.10 | | 0.08 | |
| TOTAL | 100 | 100 | 100 | 100 | 100 | 100 |

Inventive bubble gums may be prepared using the bubble gum bases of the present invention such as those listed in Examples 56–74. Illustrative formulations are given as Examples 123-134. Examples 123-128 are sugar bubble gum formulas. Note that Examples 124 and 128 use blends of two inventive bases. This is a technique to optimize processing and texture properties while minimizing the necessity of maintaining different bases for each product and without having additional custom bases compounded. Examples 129-134 are sugarless bubble gum formulas.

TABLE 11

Sugar Bubble Gums
EXAMPLES 123-128

| Example | 123 | 124 | 125 | 126 | 127 | 128 |
|---|---|---|---|---|---|---|
| Base Example # | 69 | 72/74 | 74 | 72 | 59 | 72/69 |
| Base % | 24.02 | 11.00/11.00 | 22.20/ | 20.01 | 19.99 | 9.00/13.00 |
| Flavor | 0.80 (Fruit Flavor) | 0.85 (Cream Soda) | 0.60 (Lemon Lime) | 0.60 (Blueberry) | 0.60 (Strawberry) | 0.80 (Cream Soda) |
| Flavor | | 0.03 (Vanilla) | | | | 0.02 (Vanilla) |
| Sugar | 55.10 | 59.54 | 55.95 | 59.00 | 59.75 | 57.98 |
| Corn Syrup* | 17.68 | 16.53 | 19.54 | 17.99 | 16.88 | 17.44 |
| Lecithin | 0.60 | 0.35 | 0.40 | 0.51 | 0.50 | 0.45 |
| Glycerin | 1.74 | 0.70 | 0.40 | 0.81 | 1.49 | 1.31 |
| Color | 0.06 (Red) | | 0.01 (Green) | 0.48 (Blue) | 0.08 (Red) | |
| Citric Acid | | | 0.90 | 0.60 | 0.70 | |
| TOTAL | 100 | 100 | 100 | 100 | 100 | 100 |

*Corn syrup may be high solids corn syrup, corn syrup solids, or may be partially substituted for by using glycerin coevaporated Lycasin.

TABLE 12

Sugarless Bubble Gums
EXAMPLES 129-134

| Example | 129 | 130 | 131 | 132 | 133 | 134 |
|---|---|---|---|---|---|---|
| Base Example # | 63 | 64 | 69 | 71 | 71 | 60 |
| Base % | 24.00 | 24.59 | 28.00 | 29.12 | 30.10 | 26.71 |
| Flavor | 1.20 (Fruit Flavor) | 1.41 (Fruit Flavor) | 1.71 (Grape Flavor) | 1.34 (Strawberry Flavor) | 1.11 (Lemon Flavor) | 1.23 (Peach Flavor) |
| Sorbitol | 40.0 | 51.88 | 46.03 | 44.54 | 46.39 | 49.33 |
| Calcium Carbonate | 5.00 | 4.31 | | | | |
| Talc | | | 3.71 | 3.44 | 1.99 | 3.44 |
| Lecithin | 1.00 | 0.91 | 0.84 | 0.61 | 0.86 | 0.75 |
| Citric Acid | | | | 0.31 | 0.31 | |
| Malic Acid | | | 0.21 | 0.11 | 0.31 | 0.16 |
| Tartaric Acid | | | 0.36 | 0.11 | | |
| Glycerin | 17.00 | 10.00 | 9.00 | 15.09 | 8.21 | 12.00 |
| Lycasin/Glycerin | 11.47 | 6.79 | 9.61 | 5.11 | 10.41 | 6.00 |
| Color | 0.02 (Red) | 0.01 (Red) | 0.06 (Red/Blue) | 0.02 (Red) | 0.05 (Yellow) | 0.01 (Red) |
| Encapsulated Aspartame | 0.27 | | 0.41 | | | 0.31 |
| Free Aspartame | 0.04 | | 0.06 | | 0.17 | 0.06 |
| Acesulfame K | | | | 0.11 | | |
| Encapsulated Alitame | | 0.10 | | | | |
| Sucralose | | | | 0.09 | 0.09 | |
| TOTAL | 100 | 100 | 100 | 100 | 100 | 100 |

EXAMPLES 135-150

To demonstrate differences between gum formulas with wax and wax-free bases the following base formulas and gum formulas were made:

| Example | 135 | 136 | 137 | 138 | 139 | 140 |
|---|---|---|---|---|---|---|
| Base Ingredients | | | | | | |
| Mono- crystalline wax | 10.0 | — | 13.0 | — | 6.5 | — |
| Styrene Butadiene | 2.1 | 2.1 | — | — | — | — |
| Isoprene/Isobutylene | 7.2 | 5.7 | — | — | — | — |
| Polyisobutylene | 7.4 | 8.9 | 7.0 | 7.9 | 10.8 | 11.9 |
| PVAC | 15.3 | 15.3 | 31.3 | 34.2 | 35.3 | 37.0 |
| Glycerol esterified Rosin | 19.1 | 19.1 | 13.0 | 14.8 | 18.5 | 20.3 |
| CaCO₃/talc* | 20.6 | 24.0 | 25.1 | 29.8 | 15.9* | 16.7* |
| Hydrogenated Vegetable | 14.3 | 21.4 | — | — | — | — |

-continued

EXAMPLES 135-150
To demonstrate differences between gum formulas with
wax and wax-free bases the following base formulas
and gum formulas were made:

| Example | 135 | 136 | 137 | 138 | 139 | 140 |
|---|---|---|---|---|---|---|
| Oil | | | | | | |
| Glycerol Monostearate | 4.0 | 3.5 | 5.9 | 5.0 | 7.7 | 4.5 |
| Glycerol triacetate | — | — | 4.7 | 5.3 | 5.3 | 5.7 |
| Acetylated Monoglycerides | — | — | — | 3.0 | — | 3.9 |

*indicates talc, no * indicates CaCo₃

The wax-free base formula for Example 136 is very similar to Example 15 previously shown. The wax-free base formula in Example 138 is the same formula shown previously as Example 69.

The wax-free base formula of Example 140 is the same formula shown previously as Example 74.

The gum bases of Examples 135 and 136 were each used to prepare sugar free gum products by the following formulas:

| Example | 141 | 142 | 143 | 144 |
|---|---|---|---|---|
| Gum Base of Example | 140 | 141 | 140 | 141 |
| Base | 25.2 | 25.2 | 25.2 | 25.2 |
| Sorbitol | 48.32 | 48.32 | 48.46 | 48.46 |
| Coevaporated Lycosin/Glycerin | 9.3 | 9.3 | 9.3 | 9.3 |
| Mannitol | 8.0 | 8.0 | 8.0 | 8.0 |
| Glycerin | 7.4 | 7.4 | 7.4 | 7.4 |
| Peppermint Flavor | 1.4 | 1.4 | — | — |
| Spearmint Flavor | — | — | 1.3 | 1.3 |
| Lecithin | 0.13 | 0.13 | 0.13 | 0.13 |
| Encapsulated Aspartame | 0.25 | 0.25 | 0.21 | 0.21 |

After mixing, the gum loaves having the wax-free base were sheeted with less tempering, since they began to set up faster. Sheeting machine adjustments for extrusion temperature were higher and scoring rolls had to be reset in order to properly sheet and score the gum with wax-free base. Even though the gum was softer with wax-free base compared to gum made with wax base, a surface toughness was noted that allowed the gum to be more easily handled after sheeting and before wrapping. Because of this surface toughness, gum could be wrapped sooner after sheeting than could the gum made with wax base. Even though the wax-free gum was softer, it was just as easy to wrap as the wax containing gum.

To demonstrate differences in softness, Taber Stiffness data was taken 2 weeks after manufacture. Results were:

| Taber Stiffness (average of 5 sticks) | |
|---|---|
| Example 141 | 56.8 |
| Example 142 | 41.0 |
| Example 143 | 54.2 |
| Example 144 | 32.2 |

Results show that a wax-free gum made with wax-free base gives a softer initial bite than gum made with base containing wax.

The Taber Stiffness is used to measure the stiffness of stick chewing gum. Chewing gum in the pellet form or chunk form, as is the case of most soft bubble gums, is measured for toughness using an Instron physical test. The Instron measures the force required for a probe to penetrate a piece of chunk gum to a depth of 0.1 inch. Instron data is expressed as work, in pounds-inches.

For Examples 145-146, bases of Examples 137 and 138 were used to make a chunk sugar bubble gum type fruit product according to the following formula.

| Example | 145 | 146 |
|---|---|---|
| Base of Example | 137 | 138 |
| Base | 24.0 | 24.0 |
| Sugar | 55.04 | 55.04 |
| High maltose syrup | 17.7 | 17.7 |
| Glycerin | 1.8 | 1.8 |
| Fruit Flavor | 0.8 | 0.8 |
| Lecithin | 0.6 | 0.6 |
| Color | 0.06 | 0.06 |
| Instron work, pound-inches | 0.100 | 0.0492 |

For Examples 147-150, the bases of Examples 139-140 were used to make a chunk sugar bubble gum having tart flavors according to the following formulas:

| Example | Example 147 | Example 148 | Example 149 | Example 150 |
|---|---|---|---|---|
| Base of Example | 139 | 140 | 139 | 140 |
| Base | 22.2 | 22.2 | 20.0 | 20.0 |
| Sugar | 55.99 | 55.99 | 56.95 | 56.95 |
| High maltose syrup | 19.5 | 19.5 | 20.0 | 20.0 |
| Glycerin | 0.4 | 0.4 | 1.0 | 1.0 |
| Lecithin | 0.4 | 0.4 | 0.5 | 0.5 |
| Lemon Flavor | 0.6 | 0.6 | — | — |
| Blueberry Flavor | — | — | 0.6 | 0.6 |
| Citric acid | 0.9 | 0.9 | 0.6 | 0.6 |
| Color | 0.01 | 0.01 | 0.35 | 0.35 |
| Instron, pound-inches | 0.235 | 0.056 | .0437 | .0224 |

As shown by the Instron data, Examples 146, 148 and 150 made with wax-free bases have a lower value and thus have a softer initial bite than does a comparable gum made with wax containing base even though the gum formulations are the same.

While the gums of our invention are described above, in terms of their ingredients, the inventive gums also are defined in terms of initial soft bite, and preferably also in terms of toughness. Initial soft bite can be related to Taber Stiffness for stick gum and toughness of pellet or chunk gum can be related to Instron data.

The preferred chewing gum formulated with the elastomer blends above described, and with the sweeteners, bulking agents, and binders, and particularly with the water soluble/dispersible softeners which can be added during chewing gum mixing, also have a Taber Stiffness between about 15 to about 55 Taber Units. The gums may also have an Instron yield of from about 0.02 to about 0.08 pound-inches. Whatever values of Taber Stiffness or Instron yields, the new wax-free gums are at least 5 percent, and often from 10 to about 40 percent softer than comparable wax containing gums.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A substantially wax-free chewing gum having an initial soft bite comprising a gum base comprising:
   about 20 to about 60 weight percent of a blend of at least two synthetic elastomers;
   0 to about 30 weight percent of at least one natural elastomer;
   about 5 to about 55 weight percent of at least one elastomer plasticizer;
   about 4 to about 40 weight percent filler; and
   about 5 to about 40 weight percent of at least one softener, said chewing gum also having a Taber Stiffness at least 5 percent less than the Taber Stiffness of a comparable wax containing gum.

2. The chewing gum of claim 1, wherein the natural elastomer is selected from the group consisting of jelutong, lechi caspi, perillo, sorva, massaranduba balata, massaranduba chocolate, nispero, rosin dinha, chicle, gutta hang kang, smoked or liquid latex, guayule, chiquibul, crown gum, pendare, venezuelau chicle, leche de vaca, niger gutta, tunu, chilte, and combinations thereof.

3. The chewing gum of claim 1, wherein the synthetic elastomers are selected from at least two of the group consisting of polyisobutylene, polyisoprene, isobutylene-isoprene copolymer, butadiene-styrene copolymer, polyvinylacetate, vinyl acetate-vinyl laurate copolymer.

4. The chewing gum of claim 3, wherein the synthetic elastomers are selected from at least two elastomers from the group styrene-butadiene copolymer, polyisobutylene elastomer, isobutylene- isoprene copolymer, and polyvinylacetate.

5. The chewing gum of claim 1, wherein the elastomer plasticizer is selected from the group consisting of glycerol esters of rosin, glycerol esters of partially hydrogenated rosin, glycerol esters of polymerized rosin, glycerol esters of partially dimerized rosin, partially hydrogenated methyl esters of rosin, glycerol esters of tall oil rosin, pentaerythritol esters of rosin, methyl esters of rosin, pentaerythritol esters of partially hydrogenated rosin, synthetic terpene resin, natural terpene resin, and combinations thereof.

6. The chewing gum of claim 1, wherein the filler is selected from the group consisting of calcium carbonate, magnesium carbonate, talc, ground limestone, magnesium silicate, aluminum silicate, clay, alumina, titanium dioxide, mono-, di- and tri-calcium phosphates, cellulose, and combinations thereof.

7. The chewing gum of claim 1, wherein the softener is selected from the group consisting of tallow, hydrogenated tallow, hydrogenated vegetable oils, partially hydrogenated vegetable oils, cocoa butter, glycerol monostearate, mono-, di- and triglycerides, acetylated monoglycerides, glycerol diacetate, glycerol triacetate, lecithin, fatty acids, lanolin, and combinations thereof.

8. The chewing gum of claim 1, comprising:
   about 25 to about 45 weight percent of a blend of at least two synthetic elastomers;
   about 10 to about 40 weight percent elastomer plasticizer;
   about 5 to about 30 weight percent filler; and
   about 15 to about 35 weight percent softener.

9. The chewing gum of claim 1, comprising:
   about 12 to about 30 weight percent natural elastomer;
   about 20 to about 40 weight percent of a blend of at least two synthetic elastomers;
   about 5 to about 25 weight percent elastomer plasticizer;
   about 4 to about 25 weight percent filler; and
   about 15 to about 30 weight percent softener.

10. The chewing gum of claim 1, comprising:
    about 30 to about 60 weight percent of a blend of at least two synthetic elastomers;
    about 5 to about 55 weight percent elastomer plasticizer;
    about 10 to about 35 weight percent filler; and
    about 5 to about 25 weight percent softener.

11. The chewing gum of claim 1, prepared by:
    adding a first portion of at least one of the synthetic elastomers and a first portion of filler to a mixer;
    adding softener to the mixer along with a second portion of the remaining synthetic elastomer and a first portion of at least one other synthetic elastomer and a second portion of filler;
    adding elastomer plasticizer to the mixer along with a third portion of the remaining synthetic elastomer and a third portion of filler;
    blending the ingredients together; and
    removing heat at about 30 minutes to about 90 minutes into the mixing time of the base production process, and then
    completing mixing and sequentially adding, in any order, water soluble sweeteners, bulking agents, binders and water soluble/dispersible softeners, and flavoring agents, and mixing to form a chewing gum mixture, and then
    forming the mixture into a gum loaf,
    tempering the loaf at from 35°–45° C. and 65–75 percent relative humidity for from 10 to 30 minutes to form a tempered loaf,
    extruding the tempered loaf in an extruder having an exit temperature of from about 55°–65° C. to form a continuous gum ribbon, and
    processing said ribbon by reducing its thickness, scoring and cutting to form gum sheets, and tempering said sheets for from 6–24 hours, and then breaking said sheets into gum pieces and wrapping the pieces.

12. The chewing gum of claim 1 having a Taber Stiffness of from about 15 to 55 Taber Units and an Instron yield of from about 0.02 to 0.08 pound-inches.

13. A wax-free chewing gum having reduced tack and soft initial bite properties, comprising:
    a water soluble bulk portion;
    one or more flavoring agents; and
    a water insoluble chewing gum base consisting primarily of about 20 to about 60 percent of a blend of at least two synthetic elastomers, about 10 to about 40 percent elastomer plasticizer, about 5 to about 30 percent filler, and about 15 to about 35 percent softener, by weight of the gum base, said chewing gum having a Taber Stiffness at least 5 percent lower than that of a comparable wax containing gum.

14. The wax-free chewing gum of claim 13, wherein the synthetic elastomers are selected from at least two elastomers from the group consisting of styrene-butadiene copolymer, isoprene-isobutylene copolymer, polyisobutylene, and polyvinylacetate.

15. The wax-free chewing gum of claim 13, wherein the elastomer plasticizer is selected from the group consisting of glycerol ester of wood rosin, glycerol ester of partially hydrogenated wood rosin, terpene resins and combinations thereof.

16. The wax-free chewing gum of claim 13, wherein the filler is selected from the group consisting of calcium carbonate, talc, and combinations thereof.

17. The wax-free chewing gum of claim 13, wherein the softener is selected from the group consisting of hydrogenated vegetable oils, glycerol monostearate, triacetin, ledithin, and combinations thereof.

18. A wax-free chewing gum, comprising:
a water soluble bulk portion;
one or more flavoring agents; and
a water insoluble chewing gum base consisting primarily of about 12 to about 30 percent natural elastomers, about 20 to about 40 percent of at least two synthetic elastomers, about 5 to about 25 percent elastomer plasticizer, about 4 to about 25 percent filler, and about 15 to about 30 percent softener, by weight of the chewing gum base, said chewing gum having a Taber Stiffness ranging from about 15 to 55, and an Instron data of from 0.02 to 0.08 pound-inches.

19. The wax-free chewing gum of claim 18, wherein the natural elastomer is selected from the group consisting of jelutong, sorva, chicle, massaranduba balata, and combinations thereof.

20. The wax-free chewing gum of claim 18, wherein the synthetic elastomers are selected from at least two elastomers from the group consisting of styrene-butadiene elastomer, isoprene-isobutylene copolymer, polyisobutylene, polyvinylacetate.

21. The wax-free chewing gum of claim 18, wherein the elastomer plasticizer is selected from the group consisting of glycerol esters of partially hydrogenated rosin, methyl esters of rosin, glycerol esters of rosin, terpene resin, and combinations thereof.

22. The wax-free chewing gum of claim 18, wherein the filler is selected from the group consisting of calcium carbonate, talc, and combinations thereof.

23. The wax-free chewing gum of claim 18, wherein the softener is selected from the group consisting of hydrogenated vegetable oils, glycerol monostearate, triacetin, lecithin, and combinations thereof.

24. A wax-free chewing gum having an initial soft bite, comprising:
a water soluble bulk portion;
one or more flavoring agents; and
a water insoluble chewing gum base consisting primarily of about 20 to about 60 weight percent of a blend of at least two synthetic elastomers, about 10 to about 50 weight percent elastomer plasticizer, about 10 to about 40 weight percent filler, and about 5 to about weight percent softener, said chewing gum having an initial soft bite, a Taber Stiffness of from about 15 to about 55 Taber Units and an Instron yield of from about 0.02 to 0.08 pound-inches, and further wherein the water soluble bulk portion comprises from about 0.1 to about 15 weight percent, based on total chewing gum, of a water soluble/dispersible softener.

25. The wax-free chewing gum of claim 24, wherein the synthetic elastomers are selected from at least two from the group consisting of styrene-butadiene copolymer, isoprene-isobutylene copolymer, polyisobutylene, polyvinylacetate.

26. The wax-free chewing gum of claim 24, wherein the blend of elastomers contains at least three elastomers.

27. The gum of claim 25, wherein the blend of elastomers contains at least three elastomers.

28. The wax-free chewing gum of claim 24, wherein the elastomer plasticizer is selected from the group consisting of glycerol esters of partially hydrogenated rosin, glycerol esters of rosin, and combinations thereof.

29. The wax-free chewing gum of claim 24, wherein the filler is selected from the group consisting of calcium carbonate, talc, and combinations thereof.

30. The wax-free chewing gum of claim 24, wherein the softener is selected from the group consisting of hydrogenated vegetable oil, glycerol monostearate, acetylated monoglyceride, glycerol triacetate, and combinations thereof.

31. A wax-free chewing gum having a soft initial bite, comprising gum base, flavor and sweetener; said gum base comprising:
about 20 to about 60 weight percent of a blend of at least two synthetic elastomers;
0 to about 30 weight percent of at least one natural elastomer;
about 5 to about 55 weight percent of at least one elastomer plasticizer;
about 4 to about 40 weight percent of at least one filler; and
about 5 to about 40 weight percent of at least two softeners, said chewing gum having both a Taber Stiffness and an Instron yield at least 5 percent less than a comparable wax containing gum, said chewing gum further comprising at least one binding agent selected from corn syrup, hydrogenated starch hydrolyzate, coevaporated Lycasin, or mixtures thereof.

32. The chewing gum of claim 31, wherein the gum has reduced tack to dental surfaces.

33. The chewing gum of claim 31, wherein the gum is sugarless.

34. The chewing gum of claim 31, wherein the gum is in the form of a coated pellet or ball.

35. The chewing gum of claim 31, wherein the gum is a bubble gum.

36. A rapid setting wax-free chewing gum having an initial soft bite as measured by having a Taber Stiffness ranging from between about 15 to about 55, and being at least 5 percent less than the Taber Stiffness of a comparable wax gum and further wherein the chewing gum comprises a gum base which comprises:

| Ingredient | Weight percent gum base |
|---|---|
| a) at least two synthetic elastomers | 20-60 percent |
| b) at least one elastomer plasticizer | 5-55 percent |
| c) at least one filler | 4-40 percent |
| d) at least one fat, oil, and softener | 5-40 percent |

37. The chewing gum base of claim 36, wherein the natural elastomer is selected from the group consisting of jelutong, lechi caspi, perillo, sorva, massaranduba balata, massaranduba chocolate, nispero, rosin dinha, chicle, gutta hang kang, smoked or liquid latex, guayule, chiquibul, crown gum, pendare, venezuelau chicle, leche de vaca, niger gutta, tunu, chilte, and combinations thereof.

38. The chewing gum base of claim 36, wherein the synthetic elastomers are selected from the group consisting of polyisobutylene, butadiene-styrene copolymer, polyvinylacetate, vinyl acetate-vinyl laurate copolymer, polyisoprene, isobutylene-isoprene copolymer, and combinations thereof.

39. The chewing gum base of claim 36, wherein the synthetic elastomers are selected from styrene-butadiene copolymer, polyisobutylene elastomer, isobutylene-isoprene copolymer, polyvinylacetate and mixtures thereof.

40. The chewing gum base of claim 36, wherein the elastomer plasticizer is selected from the group consisting of glycerol esters of rosin, glycerol esters of partially hydrogenated rosin, glycerol esters of polymerized rosin, glycerol esters of partially dimerized rosin, partially hydrogenated methyl esters of rosin, glycerol esters of tall oil rosin, pentaerythritol esters of rosin, methyl esters of rosin, pentaerythritol esters of partially hydrogenated rosin, synthetic terpene resin, natural terpene resin, and combinations thereof.

41. The chewing gum base of claim 36, wherein the filler is selected from the group consisting of calcium carbonate, magnesium carbonate, talc, ground limestone, magnesium silicate, aluminum silicate, clay, alumina, titanium dioxide, mono-, di- and tri-calcium phosphates, cellulose, and combinations thereof.

42. The chewing gum base of claim 36, wherein the softener is selected from the group consisting of tallow, hydrogenated tallow, hydrogenated vegetable oils, partially hydrogenated vegetable oils, cocoa butter, glycerol monostearate, mono-, di- and triglycerides, acetylated monoglycerides, glycerol diacetate, glycerol triacetate, lecithin, fatty acids, lanolin, and combinations thereof.

43. The chewing gum of claim 36 which further comprises flavoring agents and a water soluble bulk portion, which bulk portion contains from about 0.1 to about 15.0 weight percent water soluble/water dispersible softener selected from the group consisting of glycerin, propylene glycol, glycerol monostearate, lecithin, and mixtures thereof.

44. The chewing gum of claim 36 wherein the water soluble bulk portion further comprises sweeteners selected from the group consisting of low intensity sweeteners, high intensity sweeteners, and mixtures thereof.

* * * * *

UNITED STATES PATENT AND TRADEMARK OFFICE
CERTIFICATE OF CORRECTION

PATENT NO. : 5,437,877
DATED : August 1, 1995
INVENTOR(S) : Steven P. Synosky et al.

It is certified that error appears in the above-indentified patent and that said Letters Patent is hereby corrected as shown below:

On the Title Page

On page 2, under U.S. PATENT DOCUMENTS, in column 1, line 51, delete "Rickey" and substitute --Richey--.

In column 1, line 25, delete "adhesive" and substitute --abhesive--.

In column 1, line 37, delete "isobutyleneisoprene" and substitute --isobutylene-isoprene--.

In column 3, line 66, delete "adhesive" and substitute --abhesive--.

In column 4, line 64, delete "adhesive" and substitute --abhesive--.

In column 5, approximately line 7, in TABLE 1, in the second line of the title, delete "Gun" and substitute --Gum--.

UNITED STATES PATENT AND TRADEMARK OFFICE
CERTIFICATE OF CORRECTION

PATENT NO. : 5,437,877
DATED : August 1, 1995
INVENTOR(S) : Steven P. Synosky et al.

It is certified that error appears in the above-indentified patent and that said Letters Patent is hereby corrected as shown below:

In column 11, approximately line 33, in TABLE 2, under Example 45, for GLYCEROL ESTERS OF ROSIN, delete "11.3" and substitute --15.7--.

In column 11, approximately line 33, in TABLE 2, under Example 46, for GLYCEROL ESTERS OF ROSIN, delete "15.7" and substitute "—".

In column 11, approximately line 33, in TABLE 2, for GLYCEROL ESTERS OF ROSIN, adjacent to the right of "15.7" delete "—".

In column 15, approximately line 17, in TABLE 3, under GENERIC INGREDIENTS, delete "TRIMACETATE" and substitute --TRIACETATE--.

In column 16, line 44, delete ".least" and substitute --least--.

In column 18, line 23, delete "Order" and substitute --order--.

In column 20, line 60, delete "0,300" and substitute --0.300--.

UNITED STATES PATENT AND TRADEMARK OFFICE
CERTIFICATE OF CORRECTION

PATENT NO. : 5,437,877
DATED : August 1, 1995
INVENTOR(S) : Steven P. Synosky et al.

It is certified that error appears in the above-indentified patent and that said Letters Patent is hereby corrected as shown below:

In column 21, line 32, delete ".provide" and substitute --provide--.

In column 22, line 32, after "flavors" insert --,--.

Between columns 23 and 24, approximately line 11, in TABLE 4, under Example 86, for the ingredient Sugar, delete "51.86" and substitute --51.85--.

Between columns 23 and 24, approximately line 14, in TABLE 4, under Example 84, for the ingredient Dextrose, delete "3.56" and substitute --3.55--.

Between columns 23 and 24, approximately line 35, in TABLE 5, under Example 89, for the ingredient Sorbitol, delete "66.70" and substitute --55.70--.

Between columns 23 and 24, approximately line 35, in TABLE 5, under Example 90, for the ingredient Sorbitol, delete "65.16" and substitute --55.15--.

Between columns 23 and 24, approximately line 48, in TABLE 5, under the column Example, delete "Aspartame" and substitute --Alitame--.

UNITED STATES PATENT AND TRADEMARK OFFICE
CERTIFICATE OF CORRECTION

PATENT NO. : 5,437,877
DATED : August 1, 1995
INVENTOR(S) : Steven P. Synosky et al.

It is certified that error appears in the above-indentified patent and that said Letters Patent is hereby corrected as shown below:

Between columns 23 and 24, approximately line 62, in TABLE 6, under the column Example, delete "Bass" and substitute --Base--.

Between columns 23 and 24, approximately line 65, in TABLE 6, under Example 96, for the ingredient Dextrose, delete "10.0".

Between columns 23 and 24, approximately line 65, in TABLE 6, under Example 98, for the ingredient Dextrose, insert --10.0--.

Between columns 25 and 26, approximately line 40, in TABLE 7, under Example 100, for the ingredient Coevaporated, delete "7.64" and substitute --7.84--.

Between columns 25 and 26, approximately line 41, in TABLE 7, under the column Example, delete "Lyeasin" and substitute --Lycasin--.

Between columns 27 and 28, approximately line 12, in TABLE 8, under Example 106, for the ingredient Corn Syrup*, delete "1 8.50" and substitute --18.50--.

UNITED STATES PATENT AND TRADEMARK OFFICE
CERTIFICATE OF CORRECTION

PATENT NO.　：　5,437,877
DATED　　　：　August 1, 1995
INVENTOR(S)：　Steven P. Synosky et al.

It is certified that error appears in the above-indentified patent and that said Letters Patent is hereby corrected as shown below:

Between columns 29 and 30, approximately line 15, in TABLE 11, under Example 125, delete "22.20/" and substitute --22.20--.

In column 31, approximately line 33, under the Example column, delete "Lycosin" and substitute --Lycasin--.

<u>In the Claims</u>

In claim 17, line 4, delete "ledithin" and substitute --lecithin--.

In claim 24, line 10, after the second occurrence of "about" insert --40--.

Signed and Sealed this

Twenty-second Day of July, 1997

Attest:

BRUCE LEHMAN

*Attesting Officer*　　　*Commissioner of Patents and Trademarks*